(12) United States Patent
Pons et al.

(10) Patent No.: US 9,015,757 B2
(45) Date of Patent: Apr. 21, 2015

(54) MERGED PROGRAM GUIDE

(75) Inventors: Juan A. Pons, Pittsboro, NC (US); Hugh Svendsen, Chapel Hill, NC (US); Eugene Matthew Farrelly, Cary, NC (US); Scott Curtis, Durham, NC (US); Harold Sutherland, San Jose, CA (US)

(73) Assignee: Eloy Technology, LLC, Wilmington, DE (US)

( * ) Notice: Subject to any disclaimer, the term of this patent is extended or adjusted under 35 U.S.C. 154(b) by 894 days.

(21) Appl. No.: 12/731,676

(22) Filed: Mar. 25, 2010

(65) Prior Publication Data

US 2012/0117598 A1 May 10, 2012

Related U.S. Application Data

(60) Provisional application No. 61/163,086, filed on Mar. 25, 2009.

(51) Int. Cl.
*H04N 5/445* (2011.01)
*H04N 5/76* (2006.01)
*H04N 5/782* (2006.01)
*H04N 5/765* (2006.01)
*H04N 9/82* (2006.01)

(52) U.S. Cl.
CPC ............... *H04N 5/76* (2013.01); *H04N 5/765* (2013.01); *H04N 5/782* (2013.01); *H04N 9/8205* (2013.01)

(58) Field of Classification Search
CPC ............ H04N 5/44543; H04N 21/482; H04N 21/43615; H04N 7/106
USPC ......... 725/40–50, 78–85, 131–134, 139–142, 725/151–153; 709/217–232
See application file for complete search history.

(56) References Cited

U.S. PATENT DOCUMENTS

| 4,468,732 A | 8/1984 | Raver |
| 4,694,490 A | 9/1987 | Harvey et al. |
| 4,704,725 A | 11/1987 | Harvey et al. |
| 4,827,447 A | 5/1989 | Croes et al. |
| 4,956,774 A | 9/1990 | Shibamiya et al. |

(Continued)

OTHER PUBLICATIONS

Chang, Jui-Hung et al., "3PRS: a personalized popular program recommendation system for digital TV for P2P social networks," Multimed Tools Appl, vol. 47, pp. 31-48, 2010, published online Nov. 7, 2009, copyright 2009, Springer Science + Business Media, LLC, 18 pages.

(Continued)

*Primary Examiner* — Annan Shang

(57) ABSTRACT

A merged program guide which includes program metadata from a plurality of different media controllers. A first media controller receives program metadata that identifies a first plurality of programs. The first plurality of programs corresponds to a first content package provided by a content provider. A first program record identifying a first program of the first plurality of programs is generated. The first program record includes first program metadata associated with the first program. The first program metadata is transmitted onto a network to make the first program metadata available to a second media controller. The first media controller receives second program metadata associated with a second program of a second plurality of programs which correspond to a second content package associated with the second media controller. The first program metadata and the second program metadata are stored in a program guide on the first media controller.

23 Claims, 19 Drawing Sheets

(56) References Cited

U.S. PATENT DOCUMENTS

| | | |
|---|---|---|
| 4,965,825 A | 10/1990 | Harvey et al. |
| 5,109,414 A | 4/1992 | Harvey et al. |
| 5,115,501 A | 5/1992 | Kerr |
| 5,121,478 A | 6/1992 | Rao |
| 5,223,924 A | 6/1993 | Strubbe |
| 5,233,654 A | 8/1993 | Harvey et al. |
| 5,335,277 A | 8/1994 | Harvey et al. |
| 5,347,632 A | 9/1994 | Filepp et al. |
| 5,353,121 A | 10/1994 | Young et al. |
| 5,367,686 A | 11/1994 | Fisher et al. |
| 5,404,510 A | 4/1995 | Smith et al. |
| 5,412,808 A | 5/1995 | Bauer |
| 5,446,891 A | 8/1995 | Kaplan et al. |
| 5,526,034 A | 6/1996 | Hoarty et al. |
| 5,528,304 A | 6/1996 | Cherrick et al. |
| 5,530,852 A | 6/1996 | Meske, Jr. et al. |
| 5,550,576 A | 8/1996 | Klosterman |
| 5,579,055 A | 11/1996 | Hamilton et al. |
| 5,585,865 A | 12/1996 | Amano et al. |
| 5,587,734 A | 12/1996 | Lauder et al. |
| 5,592,660 A | 1/1997 | Yokota et al. |
| 5,594,507 A | 1/1997 | Hoarty |
| 5,594,509 A | 1/1997 | Florin et al. |
| 5,596,373 A | 1/1997 | White et al. |
| 5,598,536 A | 1/1997 | Slaughter, III et al. |
| 5,600,378 A | 2/1997 | Wasilewski |
| 5,630,119 A | 5/1997 | Aristides et al. |
| 5,652,613 A | 7/1997 | Lazarus et al. |
| 5,666,645 A | 9/1997 | Thomas et al. |
| 5,694,176 A | 12/1997 | Bruette et al. |
| 5,695,400 A | 12/1997 | Fennell, Jr. et al. |
| 5,696,897 A | 12/1997 | Dong |
| 5,701,451 A | 12/1997 | Rogers et al. |
| 5,710,884 A | 1/1998 | Dedrick |
| 5,712,129 A | 1/1998 | Ford |
| 5,712,979 A | 1/1998 | Graber et al. |
| 5,717,860 A | 2/1998 | Graber et al. |
| 5,719,786 A | 2/1998 | Nelson et al. |
| 5,727,129 A | 3/1998 | Barrett et al. |
| 5,737,599 A | 4/1998 | Rowe et al. |
| 5,754,938 A | 5/1998 | Herz et al. |
| 5,754,939 A | 5/1998 | Herz et al. |
| 5,758,257 A | 5/1998 | Herz et al. |
| 5,760,838 A | 6/1998 | Adams et al. |
| 5,761,662 A | 6/1998 | Dasan |
| 5,774,664 A | 6/1998 | Hidary et al. |
| 5,778,187 A | 7/1998 | Monteiro et al. |
| 5,784,058 A | 7/1998 | LaStrange et al. |
| 5,784,608 A | 7/1998 | Meske, Jr. et al. |
| 5,793,438 A | 8/1998 | Bedard |
| 5,801,747 A | 9/1998 | Bedard |
| 5,801,753 A | 9/1998 | Eyer et al. |
| 5,812,123 A | 9/1998 | Rowe et al. |
| 5,813,007 A | 9/1998 | Nielsen |
| 5,819,301 A | 10/1998 | Rowe et al. |
| 5,854,897 A | 12/1998 | Radziewicz et al. |
| 5,867,495 A | 2/1999 | Elliott et al. |
| 5,887,243 A | 3/1999 | Harvey et al. |
| 5,893,091 A | 4/1999 | Hunt et al. |
| 5,907,843 A | 5/1999 | Cleron et al. |
| 5,923,362 A * | 7/1999 | Klosterman ............... 725/48 |
| 5,945,988 A | 8/1999 | Williams et al. |
| 5,948,040 A | 9/1999 | DeLorme et al. |
| 5,977,964 A | 11/1999 | Williams et al. |
| 5,986,656 A | 11/1999 | Crutcher et al. |
| 5,990,890 A | 11/1999 | Etheredge |
| 6,005,563 A | 12/1999 | White et al. |
| 6,034,683 A | 3/2000 | Mansour et al. |
| 6,072,486 A | 6/2000 | Sheldon et al. |
| 6,119,098 A | 9/2000 | Guyot et al. |
| 6,141,058 A | 10/2000 | Lagoni et al. |
| 6,311,175 B1 | 10/2001 | Adriaans et al. |
| 6,317,881 B1 | 11/2001 | Shah-Nazaroff et al. |
| 6,349,297 B1 | 2/2002 | Shaw et al. |
| 6,351,467 B1 | 2/2002 | Dillon |
| 6,388,714 B1 | 5/2002 | Schein et al. |
| 6,400,478 B1 * | 6/2002 | Cheng et al. ............... 398/79 |
| 6,434,621 B1 | 8/2002 | Pezzillo et al. |
| 6,442,598 B1 | 8/2002 | Wright et al. |
| 6,459,427 B1 | 10/2002 | Mao et al. |
| 6,476,827 B1 | 11/2002 | Porter |
| 6,486,892 B1 | 11/2002 | Stern |
| 6,614,890 B2 | 9/2003 | Perlman et al. |
| 6,647,389 B1 | 11/2003 | Fitch et al. |
| 6,735,701 B1 | 5/2004 | Jacobson |
| 6,760,916 B2 | 7/2004 | Holtz et al. |
| 6,772,433 B1 | 8/2004 | LaJoie et al. |
| 6,823,344 B1 | 11/2004 | Isensee et al. |
| 6,986,154 B1 | 1/2006 | Price et al. |
| 7,096,486 B1 | 8/2006 | Ukai et al. |
| 7,149,511 B1 | 12/2006 | Bachner, III et al. |
| 7,185,355 B1 | 2/2007 | Ellis et al. |
| 7,197,713 B2 | 3/2007 | Stern |
| 7,373,650 B1 | 5/2008 | Rodriguez et al. |
| 7,395,514 B2 | 7/2008 | Stern |
| 7,454,777 B1 | 11/2008 | Nishikawa et al. |
| 7,571,452 B2 | 8/2009 | Gutta |
| 7,634,466 B2 | 12/2009 | Rose et al. |
| 7,689,510 B2 | 3/2010 | Lamkin et al. |
| 7,716,662 B2 * | 5/2010 | Seiden ............... 717/173 |
| 7,779,097 B2 | 8/2010 | Lamkin et al. |
| 7,849,486 B2 | 12/2010 | Russ et al. |
| 7,895,625 B1 | 2/2011 | Bryan et al. |
| 7,987,490 B2 | 7/2011 | Ansari et al. |
| 8,046,697 B2 | 10/2011 | Stern |
| 8,261,300 B2 * | 9/2012 | Barton et al. ............... 725/42 |
| 8,266,657 B2 * | 9/2012 | Margulis ............... 725/81 |
| 8,572,654 B2 * | 10/2013 | Knudson et al. ............... 725/45 |
| 8,631,456 B2 * | 1/2014 | Reisman ............... 725/133 |
| 2001/0023401 A1 | 9/2001 | Weishut et al. |
| 2002/0038387 A1 | 3/2002 | Fuiks et al. |
| 2002/0053078 A1 | 5/2002 | Holtz et al. |
| 2002/0053081 A1 | 5/2002 | Griggs |
| 2002/0174428 A1 | 11/2002 | Agnihotri et al. |
| 2002/0175931 A1 | 11/2002 | Holtz et al. |
| 2002/0186233 A1 | 12/2002 | Holtz et al. |
| 2003/0038840 A1 | 2/2003 | Stern |
| 2003/0048299 A1 | 3/2003 | Stern |
| 2003/0048808 A1 | 3/2003 | Stahl et al. |
| 2003/0051246 A1 * | 3/2003 | Wilder et al. ............... 725/49 |
| 2003/0052916 A1 | 3/2003 | Stern |
| 2003/0084452 A1 | 5/2003 | Ryan et al. |
| 2003/0088410 A1 | 5/2003 | Geidl et al. |
| 2003/0093793 A1 | 5/2003 | Gutta |
| 2003/0184598 A1 | 10/2003 | Graham |
| 2003/0200336 A1 | 10/2003 | Pal et al. |
| 2003/0237093 A1 * | 12/2003 | Marsh ............... 725/46 |
| 2004/0003393 A1 * | 1/2004 | Gutta et al. ............... 725/25 |
| 2004/0003400 A1 | 1/2004 | Carney et al. |
| 2004/0025180 A1 | 2/2004 | Begeja et al. |
| 2004/0049787 A1 | 3/2004 | Maissel et al. |
| 2004/0060061 A1 | 3/2004 | Parker |
| 2004/0068739 A1 | 4/2004 | Russ et al. |
| 2004/0078807 A1 * | 4/2004 | Fries et al. ............... 725/14 |
| 2004/0078814 A1 | 4/2004 | Allen |
| 2004/0131336 A1 | 7/2004 | Matsuno et al. |
| 2004/0221308 A1 | 11/2004 | Cuttner et al. |
| 2004/0268403 A1 | 12/2004 | Krieger et al. |
| 2005/0022241 A1 | 1/2005 | Griggs |
| 2005/0138658 A1 | 6/2005 | Bryan |
| 2005/0149987 A1 | 7/2005 | Boccon-Gibod et al. |
| 2005/0155052 A1 * | 7/2005 | Ostrowska et al. ............... 725/25 |
| 2005/0183110 A1 * | 8/2005 | Anderson ............... 725/12 |
| 2005/0187895 A1 | 8/2005 | Paya et al. |
| 2005/0193015 A1 * | 9/2005 | Logston et al. ............... 707/104.1 |
| 2005/0251822 A1 | 11/2005 | Knowles et al. ............... 725/39 |
| 2005/0251827 A1 * | 11/2005 | Ellis et al. ............... 725/47 |
| 2006/0020973 A1 | 1/2006 | Hannum et al. |
| 2006/0031203 A1 | 2/2006 | Rosenbaum et al. |
| 2006/0035610 A1 * | 2/2006 | Potrebic ............... 455/178.1 |
| 2006/0117354 A1 | 6/2006 | Schutte et al. |
| 2006/0117371 A1 * | 6/2006 | Margulis ............... 725/131 |
| 2006/0150214 A1 * | 7/2006 | Ramraz et al. ............... 725/44 |
| 2006/0159109 A1 | 7/2006 | Lamkin et al. |

(56) References Cited

U.S. PATENT DOCUMENTS

| | | | |
|---|---|---|---|
| 2006/0161635 | A1 | 7/2006 | Lamkin et al. |
| 2006/0161953 | A1* | 7/2006 | Walter et al. ............... 725/48 |
| 2006/0168126 | A1 | 7/2006 | Costa-Requena et al. |
| 2006/0212906 | A1 | 9/2006 | Cantalini |
| 2006/0218581 | A1 | 9/2006 | Ostrowska et al. |
| 2006/0253417 | A1 | 11/2006 | Brownrigg et al. |
| 2006/0259926 | A1 | 11/2006 | Scheelke et al. |
| 2006/0271997 | A1 | 11/2006 | Jacoby et al. |
| 2006/0282851 | A1 | 12/2006 | Errico et al. |
| 2006/0282852 | A1 | 12/2006 | Purpura et al. |
| 2007/0011702 | A1 | 1/2007 | Vaysman |
| 2007/0058924 | A1 | 3/2007 | Yeh |
| 2007/0101368 | A1 | 5/2007 | Jacoby et al. |
| 2007/0112935 | A1* | 5/2007 | Espelien ............... 709/217 |
| 2007/0143128 | A1 | 6/2007 | Tokarev et al. |
| 2007/0143260 | A1 | 6/2007 | Markov et al. |
| 2007/0157237 | A1 | 7/2007 | Cordray et al. |
| 2007/0169148 | A1 | 7/2007 | Oddo et al. |
| 2007/0250896 | A1 | 10/2007 | Parker et al. |
| 2007/0288960 | A1* | 12/2007 | Akiyama ............... 725/40 |
| 2007/0294249 | A1 | 12/2007 | Feyaerts |
| 2008/0022322 | A1* | 1/2008 | Grannan et al. ............ 725/78 |
| 2008/0034043 | A1 | 2/2008 | Gandhi et al. |
| 2008/0086746 | A1 | 4/2008 | King |
| 2008/0092056 | A1 | 4/2008 | Walter et al. |
| 2008/0134043 | A1 | 6/2008 | Georgis et al. |
| 2008/0134053 | A1 | 6/2008 | Fischer |
| 2008/0163059 | A1 | 7/2008 | Craner |
| 2008/0168495 | A1 | 7/2008 | Roberts et al. |
| 2008/0276279 | A1 | 11/2008 | Gossweiler et al. |
| 2009/0015657 | A1 | 1/2009 | Wong |
| 2009/0024910 | A1 | 1/2009 | Kamat et al. |
| 2009/0055868 | A1* | 2/2009 | Wehmeyer et al. ........ 725/40 |
| 2009/0150806 | A1 | 6/2009 | Evje et al. |
| 2009/0158337 | A1 | 6/2009 | Stiers et al. |
| 2009/0165046 | A1 | 6/2009 | Stallings et al. |
| 2009/0165053 | A1 | 6/2009 | Thyagarajan et al. |
| 2009/0254557 | A1 | 10/2009 | Jordan |
| 2009/0260038 | A1 | 10/2009 | Acton et al. |
| 2009/0293088 | A1 | 11/2009 | Mukerji et al. |
| 2009/0310030 | A1 | 12/2009 | Litwin et al. |
| 2010/0037274 | A1* | 2/2010 | Meuninck et al. ......... 725/109 |
| 2010/0070995 | A1 | 3/2010 | Pan |
| 2010/0077435 | A1 | 3/2010 | Kandekar et al. |
| 2010/0114857 | A1 | 5/2010 | Edwards et al. |
| 2010/0115554 | A1 | 5/2010 | Drouet et al. |
| 2010/0131977 | A1 | 5/2010 | San Jule et al. |
| 2010/0162172 | A1 | 6/2010 | Aroner |
| 2010/0162321 | A1 | 6/2010 | Bradley |
| 2010/0186029 | A1 | 7/2010 | Kim et al. |
| 2010/0186034 | A1 | 7/2010 | Walker |
| 2010/0199312 | A1* | 8/2010 | Chang et al. ............. 725/46 |
| 2012/0072851 | A1 | 3/2012 | Stern |
| 2012/0117471 | A1 | 5/2012 | Amidon et al. |
| 2012/0117581 | A1 | 5/2012 | Curtis et al. |
| 2012/0117595 | A1 | 5/2012 | Svendsen et al. |

OTHER PUBLICATIONS

Maes, P., "Agents that Reduce Work and Information Overload," Communications of the Association for Computer Machinery, vol. 37, No. 7, Jul. 1994, pp. 31-40 and 146, 11 pages.

Lee, Jae-Ho, "Automatic Video Management System Using Face Recognition and MPEG-7 Visual Descriptors," ETRI Journal, vol. 27, No. 6, Dec. 2005, pp. 806-809, 4 pages.

"Average U.S. Home Now Receives a Record 118.6 TV Channels," at <http://www.nielsenmedia.com/nc/portal/site/Public/menuitem . . . >, Jun. 6, 2008, Nielsen Media Research, from Internet Archive, printed May 10, 2011, 2 pages.

Zimmerman, J. et al., "Chapter 5—TV Personalization System—Design of a TV Show Recommender Engine and Interface," Personalized Digital Television: Targeting Programs to Individual Viewers, eds. Ardissono, L., Kobsa, A., and Maybury, M., Kluwer Academic Publishers, Norwell, Massachusetts, 2004, 29 pages.

Selker, T., "Coach: A Teaching Agent that Learns," Communications of the Association for Computer Machinery, vol. 37, No. 7, pp. 92-99, Jul. 1994, 8 pages.

Tusch, R. et al., "Context-Aware UPnP-AV Services for Adaptive Home Multimedia Systems," International Journal of Digital Multimedia Broadcasting, vol. 2008, Article ID 835438, received Jun. 25, 2008, accepted Jul. 15, 2008, copyright 2008, Hindawi Publishing Corporation, 12 pages.

"Dynamic Media.Com Opens for Business Just in Time for the Holidays," Business Wire, Dec. 3, 1998, copyright 1998, Business Wire, printed Dec. 4, 1998, 2 pages.

Jameson, A. et al., "Enhancing Mutual Awareness in Group Recommender Systems," in B. Mobasher & S.S. Anand (Eds.), Proceedings of the Int. Joint Conference on Artificial Intelligence 2003 Workshop on Intelligent Techniques for Web Personalization, Aug. 9-15, 2003, Acapulco, Mexico, 8 pages.

WebTV Ad, "Everything you want is on the Web (Everything you Need is on this Page.)," copyright 1997, Sony Electronics Inc., printed Nov. 20, 1998, 2 pages.

Ali-Hasan, Noor F., "Exploring Social Media Scenarios for the Television," Proceedings of the International Conference on Weblogs and Social Media 2008 (ICWSM 2008), Mar. 30-Apr. 2, 2008, Seattle, Washington, copyright 2008, Association for the Advancement of Artificial Intelligence (AAAI) Press, Menlo Park, California, 8 pages.

Curro, Tony, "Express," Express by Infoseek internet web page, updated Oct. 27, 1998, copyright 1992-1998, Tony Curro, printed Nov. 18, 1998, 5 pages.

"Expway," Company, at <http://www.expway.com/company.php>, from the Internet Archive, dated Dec. 20, 2008, printed Jun. 7, 2012, 1 page.

Livingston, Brian, Window Manager, "Free Windows tool makes meta searches a much easier task," World Electric internet web page, Nov. 2, 1998, printed Nov. 18, 1998, 3 pages.

"GeoCities and RealNetworks Team Up to Enable More Than 3 Million Homesteaders to Become Internet Broadcasters," PRNewswire, Company Press Release, RealNetworks, Inc., Mar. 1, 1999, copyright 1999, PRNewswire, printed Mar. 1, 1999, 4 pages.

Wittig et al., "Intelligent Media Agents in Interactive Television Systems," Proceedings of the International Conference on Multimedia Computing and Systems, May 15-18, 1995, Washington, D.C., IEEE Comp. Soc. Press, pp. 182-189, 8 pages.

"Interactive Demo—Part 1—YouTube," Vision TV Interactive Demonstration, posted by yanikit on Mar. 12, 2009, printed Jun. 7, 2012, 3 pages.

"i-Watch DV-CUBE," brochure and technical specification, date unknown but obtained on or prior to May 19, 2009, 2 pages.

"Macrovision—Digital Entertainment Technology Leader—Digital Conten . . . ," at <http://macrovision.com/>, from the Internet Archive, dated Feb. 16, 2009, copyright 2009, Macrovision Solutions Corporation, printed May 4, 2012, 1 page.

Kelly, Susan Baake, "Mastering WordPerfect 5," copyright 1998, Sybex, Inc., Alameda, California, pp. 51-53 and 511-513, 9 pages.

"Microsoft and Wink Communications Collaborate to Speed Adoption of Interactive Television Based on the ATVEF Specification," Microsoft TV Solutions News, Jun. 3, 1999, at <http://www.microsoft.com/tv/news/ne_wink_01.asp>, copyright 1998-1999, Microsoft Corporation, printed Jun. 15, 1999, 2 pages.

"Microsoft Announces Television Software Platform: Microsoft TV Platform Adaptation Kit (TVPAK)," PressPass, Jun. 14, 1999, at <http://www.microsoft.com/PressPass/press/1999/Jun99/TVPAKpr.htm>, copyright 1999, Microsoft Corporation, printed Jun. 15, 1999, 10 pages.

"Microsoft's TV Platform Makes Broadband Services a Reality for Cable Industry," PressPass, Jun. 14, 1999, at <http://www.microsoft.com/PressPass/features/1999/06-14ncta.htm>, copyright 1999, Microsoft Corporation, printed Jun. 15, 1999, 4 pages.

Abstract, "Netscape Communicator: Introduction to Communicator," Version 4, Netscape Communications, 1997, at <http://www.amazon.com/Netscape-Communicator-Introduction-Version/dp/0151049750>, printed Jun. 25, 2012, 4 pages.

(56) References Cited

OTHER PUBLICATIONS

Pfaffenberger, Bryan, "Netscape. Navigator: Surfing the Web and Exploring the Internet," 1995, Academic Press, Inc., pp. 88-90, 168-169, 110-111, and 286, 10 pages.

"Next Generation Mobile TV Guides," V1.0, copyright 2009, TV Genius Ltd, originally found at <http://www.tvgenius.net/whitepapers/mobile.pdf>, 11 pages.

WebTV Ad, "Now Everyone Can Experience the Internet," copyright 1998, Sony Electronics Inc., printed Nov. 20, 1998, 1 page.

International Preliminary Examination Report for PCT/US00/09120 completed Aug. 24, 2002, 5 pages.

"ProNetLink.com will Broadcast the 1999 International Business Expo Live Over the Internet," PRNewswire, Mar. 1, 1999, copyright 1999, PRNewswire, printed Mar. 1, 1999, 2 pages.

Henderson, Jr., D.A. and Card, S.K., "Rooms: The Use of Multiple Virtual Workspace to Reduce Space Contention in a Windows-Based Graphical Users Interface," Association for Computer Machinery, ACM Transactions on Graphics, vol. 5, No. 3, Jul. 1986, copyright 1987, ACM, pp. 211-243, 33 pages.

"Ruel's Set-Top Net Page—Ruel's Review: Teknema Internet TV," Feb. 12, 1998, copyright 1996-1998, Ruel T. Hernandez, printed Nov. 20, 1998, 6 pages.

"Ruel's Set-Top Net Page—Ruel's Review: WebSurfer," Jul. 16, 1998, copyright 1996-1998, Ruel T. Hernandez, printed Nov. 20, 1998, 15 pages.

Hu, Jim, "Searching expressly on Infoseek," CNET News.com, Sep. 16, 1998, at <http://news.cnet.com/news/0-1005-200-333279.html?tag=st.ne.1002 . . . >, copyright 1995-1999, CNET, Inc., printed Dec. 1, 1999, 3 pages.

WebTV Ad, "Sony and WebTV give you the Internet . . . the Easy Way," copyright 1997, Sony Electronics Inc., printed Nov. 20, 1998, 2 pages.

WebTV Ad, "Sony and WebTV give you the Internet . . . the Easy Way," copyright 1995-1996, Sony Electronics Inc., printed Nov. 20, 1998, 2 pages.

WebTV Ad, "Sony Brings the Internet to Your TV," copyright 1997, Sony Electronics, Inc., from the Internet Archive, dated Dec. 10, 1997, printed Jun. 22, 2012, 2 pages.

WebTV Ad, "Sony Consumer Electronics Guide: INT-W100," copyright 1998, Sony Electronics Inc., printed Nov. 20, 1998, 3 pages.

WebTV Ad, "Sony Consumer Electronics Guide: INT-W200," copyright 1998, Sony Electronics Inc., printed Nov. 20, 1998, 3 pages.

WebTV Ad, "Sony Consumer Electronics Guide—WebTV Internet Terminal," copyright 1998, Sony Electronics Inc., printed Nov. 20, 1998, 2 pages.

Bott, Ed and Person, Ron, "Special Edition Using Windows 95 with Internet Explorer," ISBN 0789715538, copyright 1998, Que Corporation, excerpt from Chapter 19, found at <http://proquest.safaribooksonline.com/?x=1&mode=print&sortKey=title&sortOrder=asc&vie . . . >, printed Jun. 18, 2004, 4 pages.

"Streaming Media—iParty Conference Call Available at A/V Newswire," Business Wire, Mar. 1, 1999, copyright 1999, Business Wire, printed Mar. 1, 1999, 1 page.

Gibbs, W.W., "Taking Computers to Task," Scientific American, vol. 277, No. 1, Jul. 1997, pp. 282-289, 9 pages.

Abstract, "The Art of Human-Computer Interface Design," eds. Brenda Laurel and S. Joy Mountford, copyright 1990, Addison-Wesley Longman Publishing Col, Inc., Boston, Massachusetts, at <http://dl.acm.org/citation.cfm?id=575201>, from the ACM Digital Library, printed Jun. 26, 2012, 2 pages.

Foley, James et al., "The Human Factors of Computer Graphics Interaction Techniques," IEEE CG&A, Nov. 1984, copyright 1984, IEEE, pp. 13-48, 36 pages.

Abstract, Norman, Donald A., "The Invisible Computer," The MIT Press, Sep. 1998, copyright 1998, Donald A. Norman, at <http://mitpress.mit.edu/catalog/item/default.asp?ttype=2&tid=5160>, printed Jun. 25, 2012, 1 page.

Davis, Jim, "The Miracle Box," CNET News.Com, Nov. 17, 1998, copyright 1995-1998, CNET, Inc., printed Nov. 20, 1998, 4 pages.

Johnson, Jeff et al., "The Xerox Star: A Retrospective," Computer, No. 9, Sep. 1989, copyright 1989, IEEE, pp. 11-29, 18 pages.

Abstract, Rheingold, Howard, "Tools for Thought, the People and Ideas Behind the Next Computer Revolution," Simon & Shuster, New York, 1985, 2 pages.

McNeill, Alison, "TrustedOpinion.com Offers Netflix Subscribers More Relevant Movie Recommendations," at <http://www.prlog.org/10029611-trustedopinion-com-offers-netflix-subscribers-more-releva . . . >, Sep. 5, 2007, Palo Alto, California, printed May 15, 2009, 2 pages.

WebTV Plus internet web page, "TV Crossover Links," printed Nov. 20, 1998, 1 page.

"TV Guide, TV Listings, Online Videos, Entertainment News and Celebrity News—TVGuide.com," at <http://www.tvguide.com,> from the Internet Archive, dated Feb. 1, 2009, printed Jun. 8, 2012, 3 pages.

WebTV Plus internet web page, "TV Home," printed Nov. 20, 1998, 1 page.

WebTV Plus Internet web page, "TV Listings," printed Nov. 20, 1998, 1 page.

"Video recorder scheduling code," Wikipedia, found at <http://en.wikipedia.org/wiki/Video_recorder_scheduling_code>, last modified May 4, 2009, printed Jul. 13, 2011, 3 pages.

WebTV Plus Internet web page, "Web Home," printed Nov. 20, 1998, 1 page.

WebTV Plus Internet web page, "Web PIP," printed Nov. 20, 1998, 1 page.

WebTV Plus Internet web page, "WebTV—E-Mail," printed Nov. 20, 1998, 1 page.

WebTV Plus Internet web page, "WebTV—Favorites," printed Nov. 20, 1998, 1 page.

WebTV Plus Internet web page, "WebTV—My WebTV," printed Nov. 20, 1998, 1 page.

WebTV Plus Internet web page, "WebTV—Search," printed Nov. 20, 1998, 1 page.

WebTV Plus Internet web page, "WebTV Plus," printed Nov. 20, 1998, 1 page.

"What is Express by Infoseek?" Express by Infoseek Internet web page, copyright 1996-1998, Infoseek Corporation, printed Nov. 18, 1993, 3 pages.

"What's New at Express by Infoseek," Express by Infoseek internet web page, earliest entry dated Sep. 16, 1998, copyright 1996-1998, Infoseek Corporation, printed Nov. 18, 1998, 3 pages.

"Widespread Deployment of Interactive TV Gains Steam With Fall Lineup of Enhanced Programming for WebTV Plus and WebTV for Windows," Microsoft TV Solutions, Jun. 14, 1999, at <http://www.microsoft.com/tv/news/ne_itvmom_01.asp>, copyright 1998-1999, Microsoft Corporation, 3 pages.

"XMLTV," at <http://xmltv.org/wiki/>, from the Internet Archive, dated Mar. 31, 2009, printed May 10, 2011, 4 pages.

\* cited by examiner

| NODAL DATA 32 | |
|---|---|
| NAME FIELD | 58 |
| DESCRIPTION FIELD | 60 |
| CAPABILITIES FIELD | 62 |
| SERIAL NUMBER FIELD | 64 |
| MANUFACTURER FIELD | 66 |
| MODEL FIELD | 68 |
| LOGS FIELD | 70 |
| SERVICE FIELD | 72 |
| STATE FIELD | 74 |
| LOCATION FIELD | 76 |
| PREFERENCE SETTINGS FIELD | 78 |

*FIG. 4*

| RECORDER 36 | |
|---|---|
| SOURCE | 80 |
| ENCODER | 82 |
| BUFFER | 84 |

*FIG. 5*

| | 6:00 - 7:00 _142_ | 7:00 - 8:00 _142_ | 8:00 - 9:00 _142_ |
|---|---|---|---|
| CBS | NEWS _140_ | SURVIVOR DEN-SURVIVOR (HD) _140A_ | CSI _140_ |
| ABC | NEWS _140_ | CASTLE DEN-CASTLE (HD) BEDROOM-CASTLE _140B_ | DANCING WITH STARS _140_ |
| NBC | NEWS _140_ | THE OFFICE _140_ | 30 ROCK _140_ |
| FOX | NEWS _140_ | HOUSE _140_ | FAMILY GUY _140_ |
| CW | NEWS _140_ | GOSSIP GIRL _140_ | ONE TREE HILL _140_ |

| | 6:00 - 7:00 _142_ | 7:00 - 8:00 _142_ | 8:00 - 9:00 _142_ |
|---|---|---|---|
| CBS | NEWS _140_ | SURVIVOR _140_ | CSI _140_ |
| ABC | NEWS (BEN, MATT) _140A_ | CASTLE _140_ | DANCING WITH STARS _140_ |
| NBC | NEWS _140_ | THE OFFICE _140_ | 30 ROCK _140_ |
| FOX | NEWS _140_ | HOUSE _140_ | FAMILY GUY _140_ |
| CW | NEWS (JACK, JILL) _140B_ | GOSSIP GIRL _140_ | ONE TREE HILL _140_ |

MERGED PROGRAM GUIDE

RELATED APPLICATIONS

This application claims the benefit of provisional patent application Ser. No. 61/163,086, filed Mar. 25, 2009, the disclosure of which is hereby incorporated herein by reference in its entirety.

FIELD OF THE DISCLOSURE

The present disclosure relates to a program guide that identifies programs available for presentation to a viewer, and in particular to a merged program guide containing program information obtained from a plurality of media controllers.

BACKGROUND

Devices that provide programs for entertainment are increasingly popular. Referred to herein generally as media controllers, such devices can include set top boxes, digital video recorders, intelligent gaming consoles such as the Microsoft® Xbox®, Sony® PlayStation®, and Nintendo® GameCube®, media consoles such as the Apple® TV®, personal computers, and the like. Each of these media controllers may receive programming from one or more content providers, including cable content providers, satellite content providers, internet content providers, and the like, and provide the programming to a viewer upon request.

It is increasingly common for a single household to own several media controllers, and to receive content from multiple content providers. For example, a digital video recorder in a bedroom may receive content from a cable provider that offers television programs, music channels, video on demand content, and the like. A second digital video recorder in the living room may receive content from the same cable provider, as well as a satellite provider that offers different television programs, music channels and video on demand content. A Sony® Playstation® in the basement may receive content from the Internet, and have a variety of programs and music recorded on an attached storage device.

While the proliferation of media controllers increases a viewer's choices as to what, when and where content may be consumed, it is difficult, over time, for a viewer to remember exactly which media controllers in which rooms offer access to which content. Moreover, it is difficult to track which members of a household are consuming what content. Tracking such information may not only be interesting, but may be considered necessary to ensure that certain members of a household are not consuming inappropriate content, and that other members have access to all available content regardless of the room they are in.

What is needed is an intuitive and dynamic electronic program guide that contains information identifying the content that is available from all the media controllers in a household. It would also be beneficial if the electronic program guide could identify who is consuming what content at which location, both currently and historically. Such information would, among other advantages, greatly expand a viewer's options, and enable individuals to keep track of what other individuals have, or are, consuming.

SUMMARY

Embodiments of the present disclosure include a method for generating a program guide that includes program records containing program metadata identifying programs available at multiple media controllers coupled to a local area network. Each media controller transmits program metadata identifying programs available via the respective media controller onto the network. Each media controller receives the program metadata of the other media controllers and stores the program metadata in a merged program guide. Among other advantages, the merged program guide enables the display of information relating to which programs are available at each of the media controllers at a locale, such as a residence.

A first media controller may receive a first content package from a first content provider, and provide program metadata identifying the programs available in the first content package to a second media controller. The second media controller may receive a second content package, and provide program metadata identifying the programs available in the second content package to the first media controller. Each media controller generates a merged program guide containing program records which includes program metadata identifying programs available in the first content package and the second content package.

The first media controller may compare second program metadata received from the second media controller to first program metadata identifying a program available via a first content package at the first media controller. The first media controller may determine that the second program metadata identifies the same program identified by the first program metadata. The media controller stores the second program metadata in association with the first program metadata in the guide, enabling notification to a viewer that the same program is available via multiple media controllers.

In one embodiment, a first media controller may determine which particular viewers are in proximity to the first media controller during the presentation of a program. The identity of the particular viewers may be stored in a program record corresponding to the program. The program record may be transmitted onto a network and made available to the other media controllers coupled to the network. A second media controller may cause a display on a display device identifying the program currently being presented by the first media controller, and the identity of the viewers in proximity to the first media controller.

A first media controller may determine which program is currently being presented by a second media controller, and cause a display on a display device that identifies the program. The first media controller may request that the second media controller provide a program stream of the program currently being presented by the second media controller. In response to the request, the second media controller may generate and provide via the network a program stream of the program to the first media controller. The first media controller may cause the display to present a first program that is currently being presented by the first media controller in a first area of the display device, while concurrently causing the display of the program stream from the second media controller in a second area of the display device. The first media controller may also display an identification of those viewers who are in proximity of the first media controller, as well as those viewers who are in proximity to the second media controller.

In another embodiment, the media controller may, upon request by a viewer, use the program records in the program guide to cause historical information to be displayed on the display device. For example, the media controller may cause the display to present information identifying which programs were previously presented via which media controller, and the identification of the viewers of such programs.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosed embodiments.

FIG. 4 is a block diagram illustrating exemplary nodal data according to one embodiment;

FIG. 5 is a block diagram of an exemplary recorder according to one embodiment;

FIG. 15 illustrates an exemplary guide window suitable for displaying information obtained from the merged guide;

FIG. 16 illustrates another exemplary guide window suitable for displaying historical information obtained from the merged guide;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments of the present disclosure include a method for generating a program guide that includes program records containing program metadata identifying programs available at multiple media controllers coupled to a local area network. Each media controller transmits program metadata identifying programs available via the respective media controller onto the network. Each media controller receives the program metadata of the other media controllers and stores the program metadata in a merged program guide. Among other advantages, the merged program guide enables the display of information relating to which programs are available at each of the media controllers in a residence.

Figure 1:
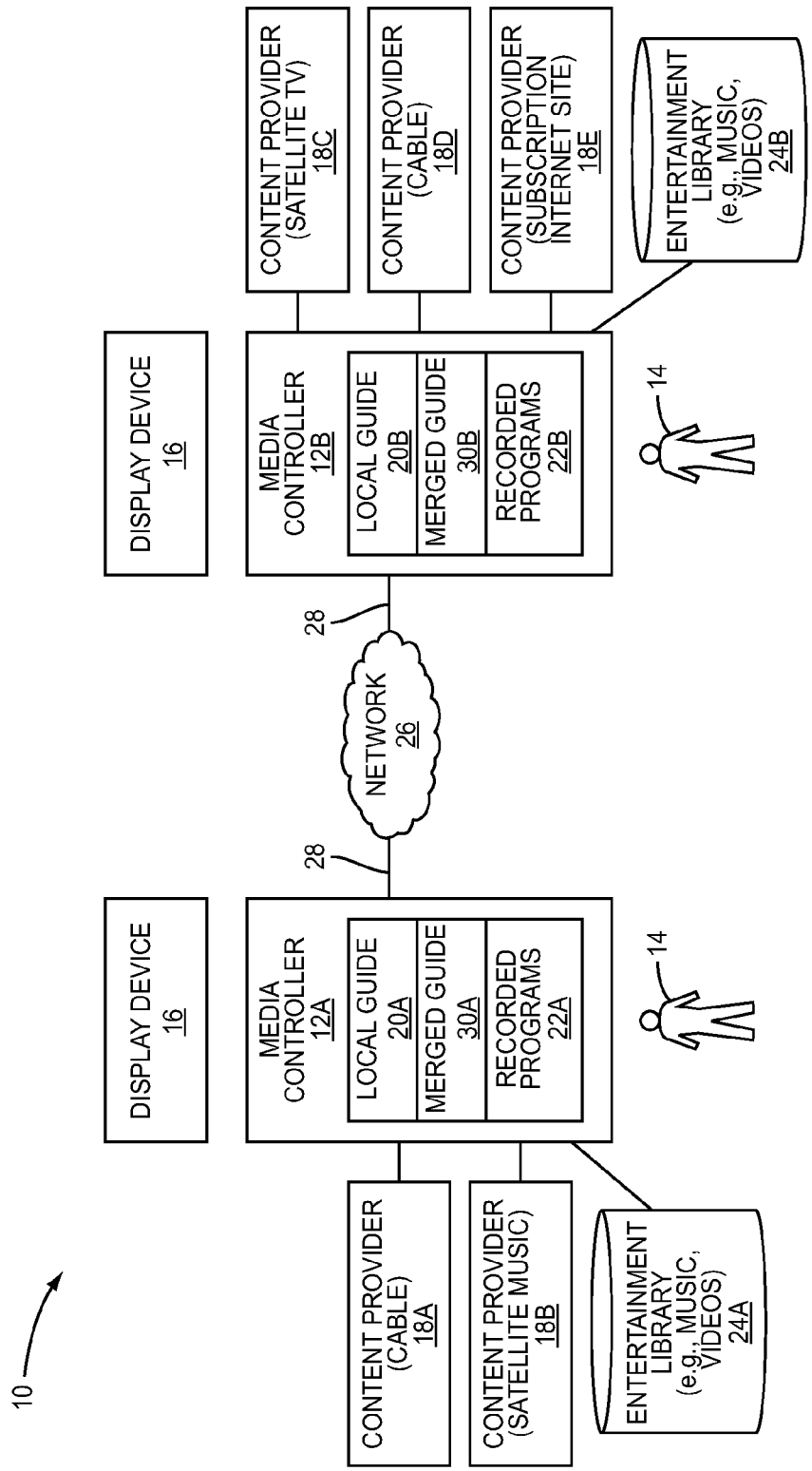
FIG. 1 is an exemplary block diagram of a locale in which embodiments may be practiced.

FIG. 1 illustrates a locale 10, such as a residence, in which media controllers 12A and 12B (generally, media controller 12 or media controllers 12) are located. The media controllers 12 may comprise any device capable of providing, presenting, or otherwise causing the display of content upon demand, such, for example, a set top box, a digital video recorder, an intelligent gaming console, such as the Microsoft® Xbox®, Sony® PlayStation®, and Nintendo® GameCube®, a media console such as the Apple® TV®, and the like. The media controllers 12 provide content to one or more viewers 14 by causing a display on a display device 16. The display device 16 may comprise any display technology, such as a television, a computer monitor, a projector, and the like. By "causing" or "cause" to display it is meant that the media controllers 12 generate output streams that are provided to output connections on the media controllers 12 (not illustrated), which are directed to a respective display device 16, typically via a cable or other signal-carrying mechanism. While for purposes of illustration the media controllers 12 and display devices 16 are illustrated as devices which are separate from one another, the display device 16 may be integral with the media controller 12. For example, a single unit may include both a media controller 12, such as a digital video recorder, and a display device 16, such as a television. Where a media controller 12 and display device 16 are integral, the signal-carrying connection between the two may not be by a connection cable, but rather by an internal bus or other signal-carrying mechanism.

The media controller 12A receives content from content providers 18A and 18B (generally content providers 18, or content provider 18). The content providers 18 may comprise any provider of content, including service providers that provide content for a direct or indirect fee, cable operators, satellite operators, internet content providers, and the like. The content received by the media controllers 12 may be any content desirable for presentation, display or otherwise rendering to a viewer 14, such as broadcast television, movies, video on demand, music, and the like. Units of content will be referred to herein as programs, and a program can refer to any unit of content that is referred to individually by the content provider, such as a particular television show, a particular movie, a song, and the like.

Content is typically, but not necessarily, provided to the media controllers 12 in a content package that is defined by a particular subscription. The subscription between the media controller 12 and the content provider 18 defines which channels and features make up a particular content package, and therefore defines the programming that will be provided by the respective content provider 18 to the media controller 12 pursuant to the subscription. For example, the media controller 12A may receive a first content package that includes premium movies and high definition content from the content provider 18A pursuant to a first subscription. The media controller 12B may receive a second content package that includes only standard definition content and no premium movies from the content provider 18D pursuant to a different subscription, even though the content provider 18A may be the same content provider as the content provider 18D. The same program may therefore be available to the same or different media controllers 12. Moreover, different versions of the same program may be available to the same or different media controllers 12. For example, the media controller 12A may have access to a high-definition version of a particular episode of Survivor, while the media controller 12B has access only to a standard-definition version of Survivor based on the respective subscriptions.

The content providers 18 typically provide a guide to the media controllers 12 that identifies programs available via the respective content provider 18. Such guides are depicted in FIG. 1 in the form of respective local electronic programming guides 20A, 20B (generally, local guides 20 or local guide 20). While for purposes of illustration each media controller 12 is shown as having only a single local guide 20, it will be understood that each media controller 12 may have multiple local guides 20, since each content provider 18 may provide its own respective local guide 20 to the media controller 12.

Local guides 20 typically comprise program metadata identifying attributes and characteristics of particular programs. The program metadata may be provided to the media controller 12 continually on a particular channel, or upon request by the media controller 12, or at certain predetermined times. The program metadata can include any data that may be useful or desirable to the viewer 14 (typically as determined by the respective content provider 18). For example, program metadata may include a title, a description, identification of well-known actors, a channel on which the program will be provided, a genre, an MPAA rating, a duration, a version, a time and date the program will be provided, and the like. Typically, a viewer 14 accesses a local guide 20 via an input device (not illustrated) such as a remote control, wherein, upon receipt of a request via the remote control, the media controller 12 will cause a display of information from the local guide 20 on the display device 16.

The media controllers 12A, 12B may also contain one or more respective recorded programs 22A, 22B (generally, recorded programs 22 or recorded program 22). The recorded programs 22 may have been previously selected by the viewer 14 for time-shifting purposes, for example, to enable the viewer 14 to view a program at a different time from when the program was originally provided by a content provider 18. Different programs may be recorded at different media controllers 12, and thus, for example, the recorded programs 22A may differ from the recorded programs 22B. The media controllers 12 may also be communicatively coupled to local entertainment libraries 24 that contain a variety of programs, such as movies, songs, videos and the like that may have been downloaded, ripped, or otherwise obtained by the viewer 14.

Each of the media controllers 12A, 12B are communicatively coupled to one another via a local area network 26. The local area network 26 may comprise any suitable communication mechanism that enables the media controllers 12A, 12B to communicate with one another, including, for example, an Ethernet network, Token Ring network, and the like. The media controllers 12 access the network 26 via communication links 28, which may comprise any suitable technology for accessing the network 26, such as, for example, WiFi, an Ethernet cable, and the like. The network 26 may use any suitable message transport protocol to enable message communications between the media controllers 12A, 12B, such as, for example, TCP/IP.

According to one embodiment, each of the media controllers 12A, 12B also includes a respective merged guide 30A, 30B (generally, merged guides 30 or merged guide 30). While the generation and contents of the merged guide 30 will be discussed later in detail, generally, each merged guide 30 contains program records identifying programs available from a variety of different sources, including programs that are available at other media controllers 12. For example, the merged guide 30A may contain program records identifying programs available from each of the content providers 18A-18E, programs available in the entertainment libraries 24A, 24B, and recorded programs 22A and 22B. Similarly, the merged guide 30B associated with the media controller 12B also preferably contains program records identifying programs available from each of the content providers 18A-18E, programs available in the entertainment libraries 24A, 24B, and recorded programs 22A and 22B. As will be discussed in greater detail herein, the media controller 12A may cause a display on the display device 16 which presents information contained in the merged guide 30A. Thus, a viewer 14 may use any media controller 12 that is coupled to the network 26 to determine the entire collection of content that may be consumed by the viewer 14.

The media controllers 12 may discover one another on the network 26 using any suitable device discovery mechanism or techniques. Device discovery mechanisms are known to those skilled in the art and will not be described in detail herein. For example, the media controller 12A may use the Bonjour® service discovery protocol to discover the media controller 12B, but the embodiments are not limited to any particular device discovery mechanism.

Figure 2:
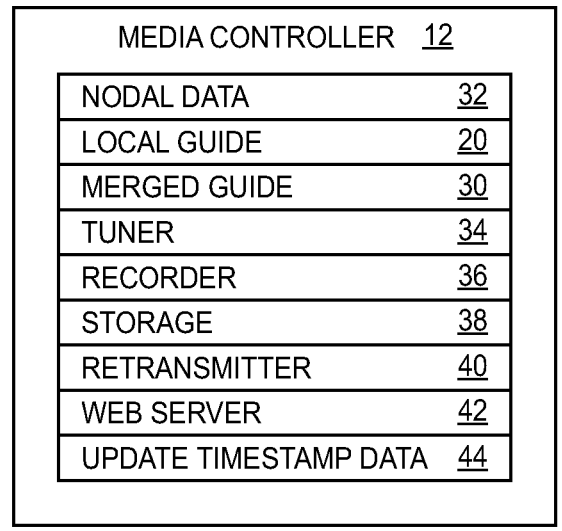
FIG. 2 is a block diagram illustrating additional detail of a media controller according to one embodiment.

FIG. 2 is a block diagram illustrating additional details of a media controller 12 according to one embodiment. The media controller 12 preferably includes nodal data 32, which includes information that may be unique to the respective media controller 12, such as, for example, a name of the media controller 12, a serial number associated with the media controller 12, log files generated by the media controller 12, and the like. Exemplary nodal data 32 will be discussed in greater detail with reference to FIG. 3. The media controller 12 includes a tuner 34 which is used to select content provided by a content provider 18. For example, the content provider 18 may concurrently provide a number of different programs to the media controller 12, each program being delivered on a particular frequency. The tuner 34, for example in response to a channel selection from a viewer 14, tunes to a particular frequency and captures the program data being provided at the particular frequency. The tuner 34 then typically causes the program to be displayed on a display device 16, or may record the program, as discussed in greater detail herein. While the tuner 34 has been discussed herein in terms of tuning to a particular frequency, it will be apparent that programs may be differentiated from one another by mechanisms other than a frequency, and the tuner 34 therefore is not limited to a frequency tuner, but may comprise any suitable tuner capable of selecting a desired program from a plurality of programs.

The media controller 12 preferably includes a recorder 36 for recording a program. The recorder 36 preferably receives input from the tuner 34, encodes the input into a desired format, if necessary, and stores the program data in a storage 38. The storage 38 may comprise any suitable storage technology, such as a hard drive, flash drive, and the like. The storage 38 is preferably a persistent storage that survives the powering down of the media controller 12, and may contain data from a variety of sources, including, for example, the local guide 20, the merged guide 30, and the like.

The media controller 12 may also include a retransmitter 40 which enables the retransmission of a program received by the media controller 12 onto the network 26. For example, the retransmitter 40 may segment the program data received by the media controller 12 into packets and transmit the packets to another media controller 12 via the network 26. The retransmitter 40 may encode the program differently from the way the program was encoded when initially received by the tuner 34. For example, in one embodiment, a first media controller 12 may request from a second media controller 12 a program stream of a program currently being presented to viewers 14 by the second media controller 12. The request may identify that a particular quality, or resolution, of the program stream is desired. For example, the first media controller 12 may intend to display the program stream in a relatively small area of a display device 16 in conjunction with other information, and thus not require a high resolution program stream. The second media controller 12 may then encode the program into a sufficiently lower resolution version of the program prior to transmitting the program stream onto the network 26 to minimize network usage.

The media controller 12 may also include a web server 42 for use in transferring program metadata between media controllers 12. For example, the web server 42 may respond to requests for program metadata from other media controllers 12. In one embodiment the program metadata may be formatted and transferred in an XML format. The media controller 12 may also include update timestamp data 44 that identifies the times that other media controllers 12 last provided program metadata to the media controller 12. The update timestamp data 44 may be used by the media controller 12 to quickly determine which program metadata received by another media controller 12 constitutes new program metadata. The receipt of program metadata by a media controller 12 and the use of the update timestamp data 44 will be described in greater detail herein.

Figure 3:
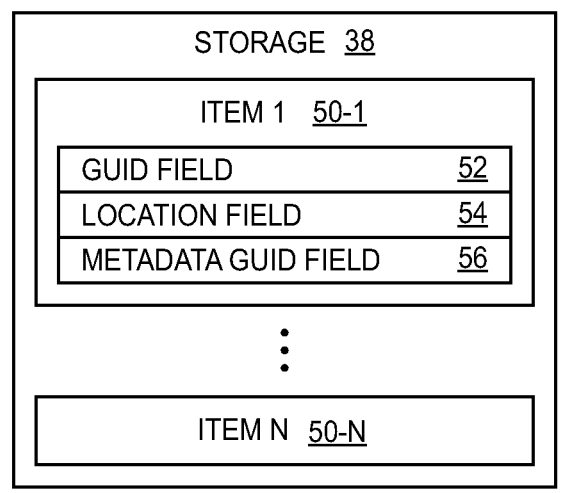
FIG. 3 is block diagram of an exemplary stored item record according to one embodiment.

FIG. 3 is block diagram of a stored item record 50-1 that contains data associated with items stored in storage 38, or elsewhere. The storage 38 may contain a plurality of stored item records 50-1-50-N. The stored item record 50-1 contains information identifying, for example, a recorded program 22, or a program in the entertainment library 24. The stored item record 50-1 may include a globally unique identifier (GUID) field 52 that contains a GUID which uniquely identifies the stored item record. The generation of a GUID is known to those skilled in the art, and will not be discussed in detail herein. The stored item record 50-1 also includes a location field 54 identifying a location of the corresponding program. The location field 54 may indicate the program resides in the storage 38, the entertainment library 24, or elsewhere. The stored item record 50-1 preferably includes a metadata GUID field 56 that contains a metadata GUID which uniquely identifies a metadata record containing metadata pertaining to the corresponding program. The metadata record may be in the storage 38, on a local server coupled to the network 26, or on a remote server accessible by the media controller 12 over a wide area network coupled to the network 26.

FIG. 4 is a block diagram illustrating exemplary nodal data 32 according to one embodiment. The nodal data 32 can include a name field 58 that contains a name which identifies the respective media controller 12. For example, the name field 58 of the media controller 12A may be "TIVO DVR", and the name field 58 of the media controller 12B may be "TimeWarner SetTop." Alternately, the name field 58 may contain a link or reference to a graphical image that depicts a particular type of media controller 12. The nodal data 32 can include a description field 60 that provides a short textual description of the capabilities of the respective media controller 12. A capabilities field 62 may identify operations performable by the respective media controller 12, and power consumption characteristics. A serial number field 64 may contain a unique manufacturer serial number of the media controller 12. A manufacturer field 66 may identify the manufacturer of the media controller 12. A model field 68 may identify a particular model of the media controller 12. Logs field 70 may comprise data generated during the operation of the media controller 12, such as, for example, faults or errors that occur during the operation of the media controller 12, and/or input selections received from viewers 14, which programs were watched at which times, and the like.

A service field 72 may contain service status information regarding the media controller 12 such as service intervals and/or wear counts. The wear count may indicate how many times particular "wear items" have been used. For example, a media controller 12 containing a hard drive may provide a wear count on the hard drive indicating how many times the hard drive has been written to. This information may in turn be used to predict how much useful life is left on the drive. A state field 74 may contain a status of the media controller 12, such as, for example "Booting", "On", "Recording", "Sleep", "Updating", and the like. A location field 76 may identify a location of the media controller 12 within the locale 10. For example, the location field 76 of the media controller 12A may contain "Den", and the location field 76 of the media controller 12B may contain "Living Room." The nodal data 32 may also include a preference settings field 78 identifying preferences of one or more viewers 14. Any desired preference data may be stored in the preference settings field 78, such as, for example, genre preferences, actor preferences, time preferences, series preferences, and the like. Preference data may be used, for example, by the media controller 12 to provide program recommendations to a viewer 14.

FIG. 5 is a block diagram of the recorder 36 according to one embodiment. The recorder 36 receives a source 80 from the tuner 34. The recorder 36 uses an encoder 82 to encode the source 80 in a desired format, such as the MPEG-2 format. The encoded program can be stored in the storage 38. The recorder 36 may include a buffer 84 for use in temporarily storing segments of the source 80 while it is being encoded.

Figure 6:
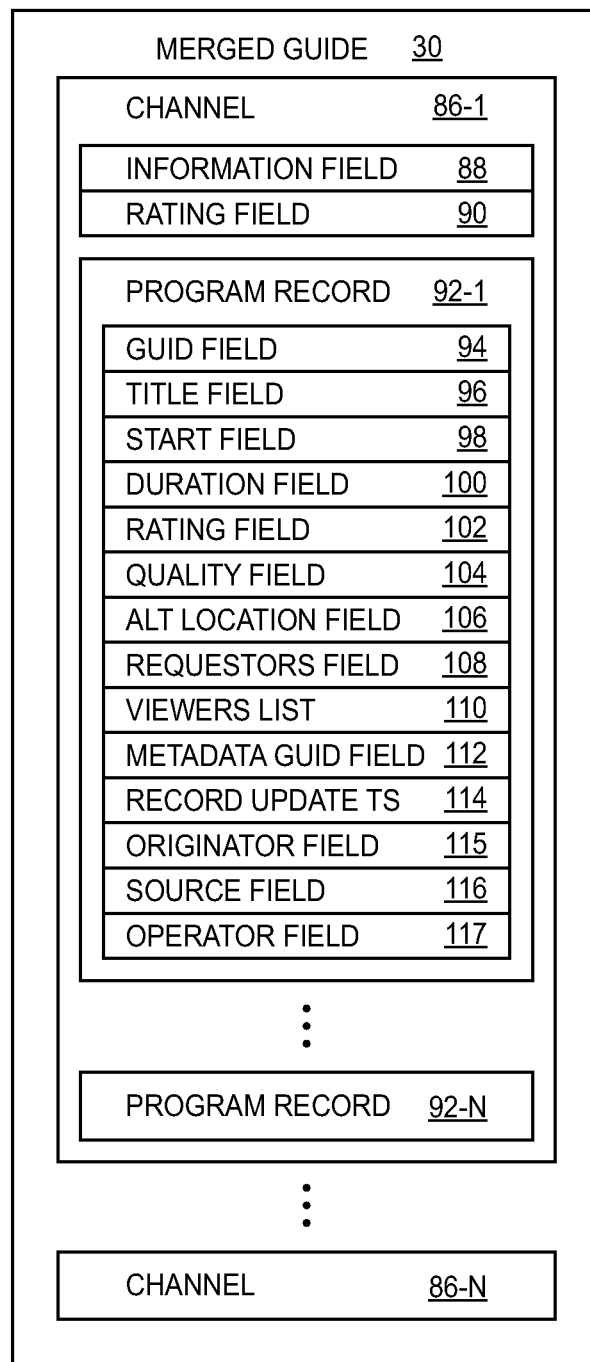
FIG. 6 is a block diagram of an exemplary merged guide according to one embodiment.

FIG. 6 is an exemplary block diagram of a merged guide 30 according to one embodiment. The format of the merged guide 30 depicted in FIG. 6 is but one exemplary layout, and the embodiments are not limited thereto. The merged guide 30 may include a plurality of channel records 86, such as channel records 86-1-86-N. The phrase "record" as used herein means a structure which contains data and may be stored and accessed as necessary, and does not imply a particular format or internal layout. The channel record 86-1 may include an information field 88 that contains text identifying source attributes of the channel, such as the particular service provider, or other source. For example, if the channel 86-1 is provided by a service provider via cable, the information field 88 may contain the name of the cable company. Alternately, the channel information field 88 may contain the ultimate source of the content associated with the channel, such as NBC, ABC, and the like. Where the content associated with the channel is provided by a local source, such as the entertainment library 24, the channel information field 88 may identify the entertainment library 24 by a name, such as "John's Video Library." The channel 86-1 may also include a rating field 90 that generally describes the content associated with the channel 86-1. For example, if the channel 86-1 is a mature adult channel, the rating field 90 may identify it as such.

Each channel 86 may include one or more program records 92. For example, the channel 86-1 contains a plurality of program records 92-1-92-N. Each program record 92 contains metadata associated with a particular program. Thus, each program record 92 corresponds to a particular program. The program record 92 may contain a GUID field 94 that contains a GUID which uniquely identifies the program. A title field 96 may contain a textual title of the program. A start field 98 may identify a present, past or future start time of the program. A duration field 100 identifies a length of the program. A rating field 102 may contain an MPAA rating of the program. A quality field 104 may identify the encoding quality of the program. An alt location field 106 may contain an alternate location of the program other than the location identified in the source field 116, described below. For example, the location identified in the source field 116 may be the source of a highest quality version of the program, while the alt location field 106 may provide a lower quality version of the program. In one embodiment, a uniform resource identifier (URI) represents the location indicated by the source field 116 and alt location field 106. The URI may point to a local media item, or may reference a program available from another media controller 12 over the network.

A requestors field 108 may contain information identifying one or more viewers 14 that have requested that the program be recorded. A viewers list 110 may identify one or more viewers 14 that were identified as being in proximity to the media controller 12 which presented the program. A metadata GUID field 112 may contain a metadata GUID which uniquely identifies a metadata record containing metadata describing additional attributes of the program. The metadata record may exist, for example, on a local or a remote server accessible by the media controller 12. An originator field 115 may identify the particular media controller 12 which originated the respective program record 92. A record update timestamp (TS) field 114 may contain a timestamp identifying the time of the last update to the record 92-1. A source field 116 may identify a location of the program, and may comprise, for example, a URI.

The program record 92 may also include an operation field 117 for identifying a particular operation performed on the corresponding program by the media controller identified in the originator field 115. For example, the operation field 117 may contain a value of 0 to indicate the no operation was performed on the program, a value of 1 to indicate the program was recorded, a value of 2 to indicate the program was presented to a viewer 14, and a value of 3 to indicate that the program was both recorded and presented to a viewer 14.

Preferably, each media controller 12 coupled to the network 26 generates program records 92 for each program that is available at the respective media controller 12. For example, referring again to FIG. 1, local guide 20A may include guides for programs available from the content providers 18A and 18B. The media controller 12A may read the local guide 20A and generate a program record 92 for each program identified in the local guide 20A. The media controller 12A may also generate program records 92 for each recorded program 22A, and each item available for presentation from the entertainment library 24A. If program metadata for such programs is unavailable, the media controller 12A may access well-known sources of program metadata from, for example, an Internet provider of such data, and use the program metadata to populate the fields of the program record 92.

Figure 7:
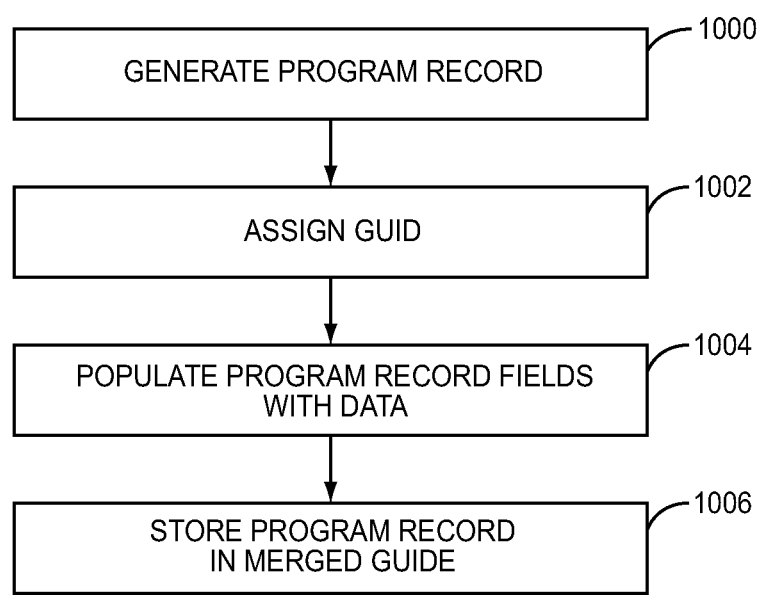
FIG. 7 is a flowchart illustrating an exemplary method for generating program records.

FIG. 7 is a flowchart illustrating an exemplary method for generating program records 92. Assume that the media controller 12A is traversing a local guide 20A, and determines that the local guide 20A identifies a program that is not identified in the merged guide 30A. For example, the content provider 18A may have recently provided the media controller 12A new program guide data that identifies programs that will be available for presentation one week from the present date. The media controller 12A generates a program record 92 (step 1000). The media controller 12A then generates a GUID that uniquely identifies this program (step 1002). The media controller 12A then populates the fields described above with regard to FIG. 6 with the appropriate data (step 1004). The media controller may insert the current time in the record update timestamp field 114. The media controller 12A then stores the program record 92 in the merged guide 30 (step 1006).

Each media controller 12 preferably provides program metadata from the program records 92 which are available from the respective media controller 12 to the other media controllers 12. For example, referring again to FIG. 1, the media controller 12A provides the media controller 12B program metadata from each of the program records 92 stored in the merged guide 30A. The media controller 12B similarly provides the media controller 12A program metadata from each of the program records 92 in the merged guide 30B. In this manner, each media controller 12 contains program records 92 identifying programs available at not only the respective media controller 12, but which are available at all media controllers 12 coupled to the network 26.

The program metadata may be provided in the same format as the program records 92, or in a different format. The program metadata may be "pushed" as desired by a media controller 12 to the other media controllers, or may be "pulled" from a media controller 12 upon request. In one embodiment, the program metadata may be provided in an XML file, which may have a format similar to the program record 92. In one embodiment, a media controller 12 may broadcast a signal on the network 26 to indicate that new program metadata is available. Referring again to FIG. 1, assume that the media controller 12A has generated one or more new program records 92. The media controller 12A may broadcast a signal on the network 26 indicating that the media controller 12A has new program metadata for distribution. The media controller 12B, upon receipt of the signal, may send a message to the media controller 12A requesting the program metadata. According to one embodiment, each media controller 12 may maintain a last update timestamp for each other media controller 12. Such last update timestamps may be maintained in the update timestamp data 44 (FIG. 2) associated with the respective media controller 12.

Figure 8:
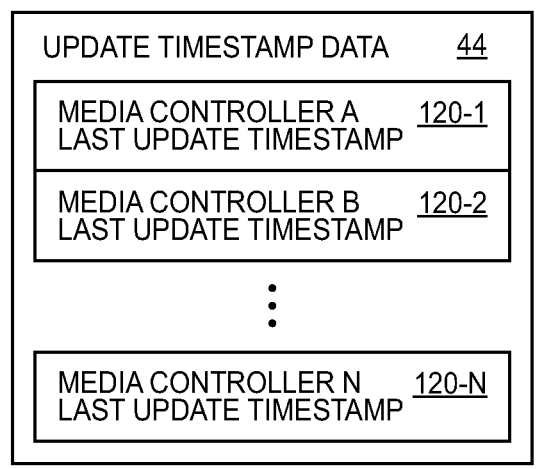
FIG. 8 is a block diagram illustrating exemplary update timestamp data according to one embodiment.

FIG. 8 is a block diagram illustrating exemplary update timestamp data 44 according to one embodiment. The update timestamp data 44 may include one or more last update timestamps 120-1-120-N (generally, last update timestamps 120), each of which may correspond to a respective media controller 12. The last update timestamps 120 identify the time of the last update of program metadata from the corresponding media controller 12. For purposes of illustration with regard to FIG. 8, a media controller 12 that has program metadata to provide to another media controller 12 will be referred to as a publishing media controller 12, and the media controller 12 receiving the program metadata will be referred to as a receiving media controller 12. The receiving media controller 12 may use a last update timestamp 120 to indicate to the publishing media controller 12 which program records 92 are needed. For example, in the current example, assume that the last update timestamp 120-1 corresponds to the publishing media controller 12. The receiving media controller 12 may provide the last update timestamp 120-1 to the publishing media controller 12 to indicate to the publishing media controller 12 that the receiving media controller 12 only requires program metadata from those program records 92 that contain a record update timestamp more recent than the last update timestamp 120-1. The publishing media controller 12 may thus use the last update timestamp 120-1 to generate an XML file containing only program metadata for those program records 92 which have a record update timestamp that is more recent than the last update timestamp 120-1. The receiving media controller 12 receives, and then processes, the program metadata and updates the last update timestamp 120-1 with the latest record update timestamp associated with any program record 92 provided by the publishing media controller 12.

Figure 9:
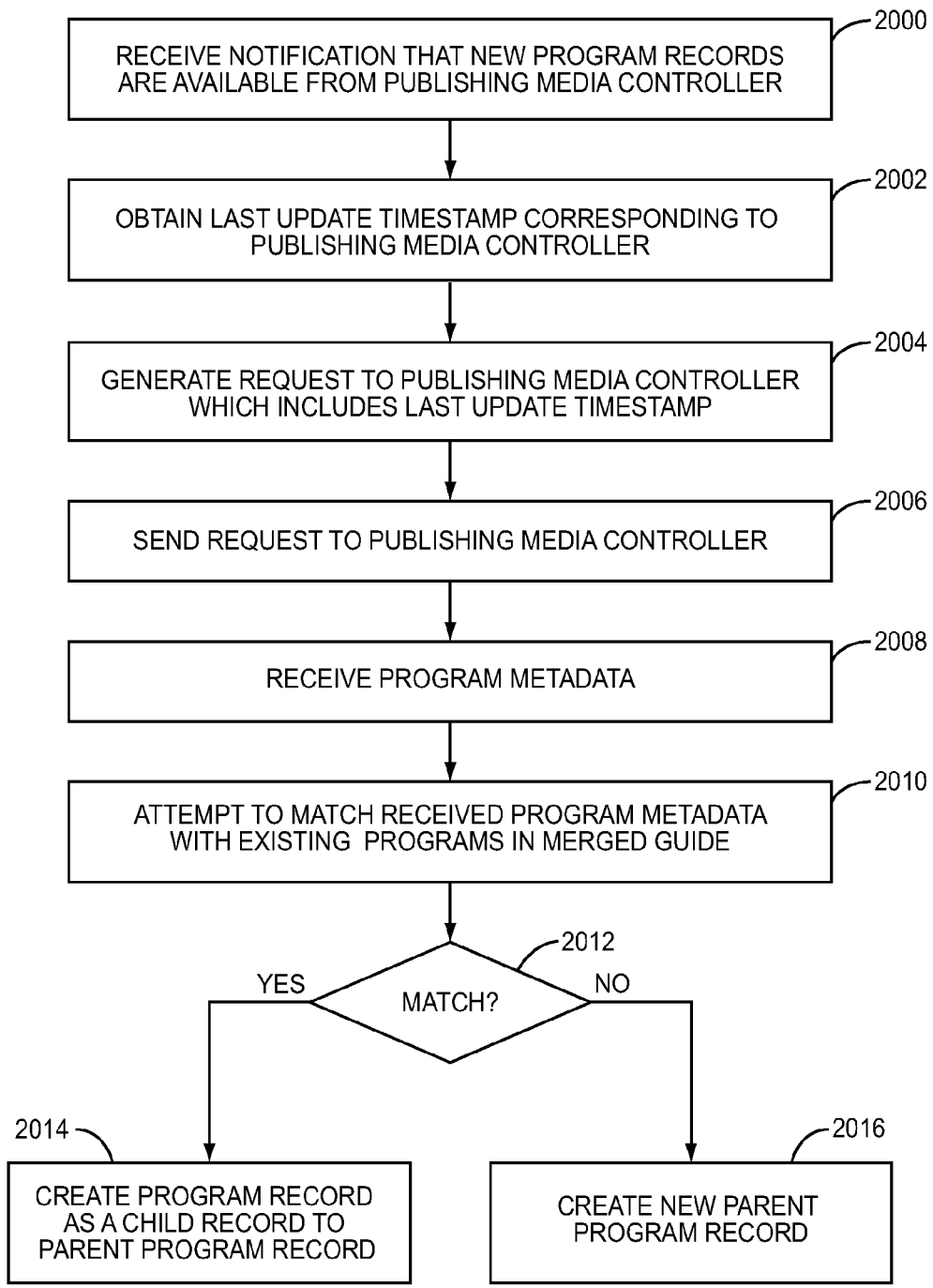
FIG. 9 is a flowchart illustrating an exemplary method for receiving and processing program metadata sent from one media controller to another media controller.

FIG. 9 is a flowchart illustrating an exemplary method for receiving and processing program metadata sent from one media controller 12 to another media controller 12. FIG. 9 will be discussed in conjunction with FIGS. 1 and 6. Again, for purposes of illustration with regard to FIG. 9, the media controller 12A will be assumed to have program metadata to distribute to the media controller 12B, and will be referred to as the publishing media controller 12A, and the media controller 12B will be referred to as the receiving media controller 12B. The publishing media controller 12A broadcasts a notification that the publishing media controller 12A has new program metadata available for distribution. The receiving media controller 12B receives the notification (step 2000). The receiving media controller 12B obtains the last update timestamp 120-1 which corresponds to the publishing media controller 12A (step 2002). The receiving media controller 12B generates a request containing the last update timestamp 120-1 and sends the request to the publishing media controller 12A (steps 2004, 2006). The publishing media controller 12A uses the last update timestamp 120-1 to select program metadata from each program record 92 having a record update timestamp that is later than the last update timestamp 120-1. The publishing media controller 12A formats the program metadata and sends it to the receiving media controller 12B. The media receiving controller 12B receives the program metadata (step 2008). The receiving media controller 12B may, for each program identified by the program metadata, attempt to match the program metadata to an existing program record 92 in the merged guide 30B (step 2010). What constitutes a "match" may be system dependent. Generally, the receiving media controller 12B may determine if various data in the provided program metadata matches corresponding data in any existing program record 92. For example, the receiving media controller 12B may determine that the program identified by the metadata matches a program identified by a program record 92 if the data from the title fields 96 match one another and the data from the start fields 98 match one another.

If the receiving media controller 12B determines that the provided program metadata matches a program identified by a program record 92 (step 2012), then the receiving media controller 12B may generate a child program record 92 from the supplied program metadata, such that the matched program record 92 in the merged guide 30A is stored in association with the child program record 92 (step 2014). Among other advantages, establishing such a parent-child relationship between program records 92 enables the receiving media controller 12B to cause the display of information to a viewer 14 that the same program is available at multiple media controllers 12. If the receiving media controller 12B determines that the program metadata does not match any existing program identified in a program record 92 (step 2012), the receiving media controller 12B may generate a program record 92 as a parent program record 92 that is not a child program record 92 to any other program record 92 (step 2016). While for purposes of illustration only two program records 92 have been shown as stored in association with one another, it is apparent any number of program records 92 that identify the same program may be stored in association with one another.

Figure 10:
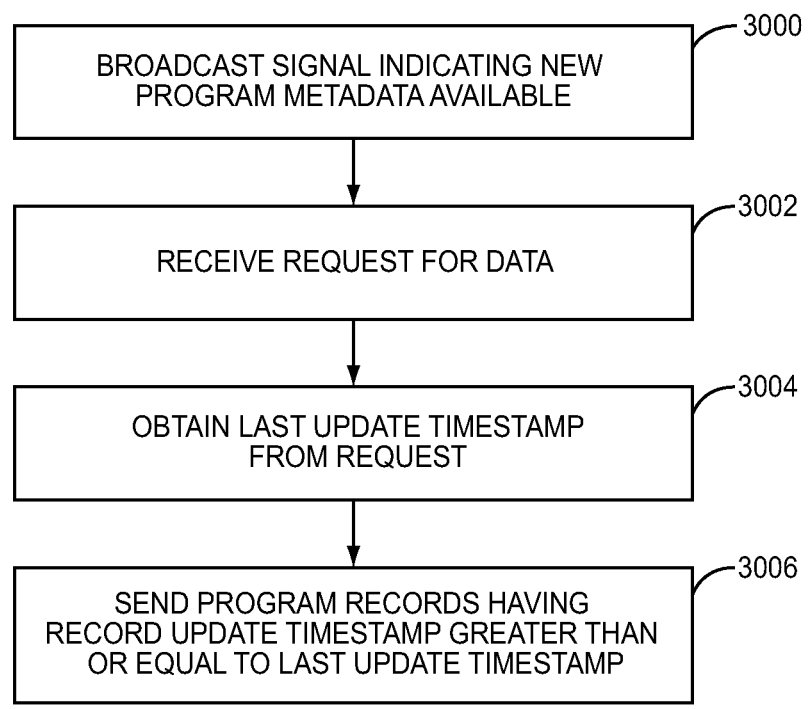
FIG. 10 is a flowchart illustrating an exemplary method for sending program metadata to another media controller.

FIG. 10 is a flowchart illustrating an exemplary method for sending program metadata to another media controller. Assume again that the publishing media controller 12A has new program metadata to distribute. The publishing media controller 12A broadcasts a notification signal onto the network 26 indicating that new program metadata is available (step 3000). The publishing media controller 12A receives a request for data from the receiving media controller 12B (step 3002). The publishing media controller 12A obtains the last update timestamp 120-1 from the request for data (step 3004). The publishing media controller 12A obtains program metadata from those program records 92 having a record update timestamp greater than the last update timestamp 120-1 (step 3006).

Figure 11:
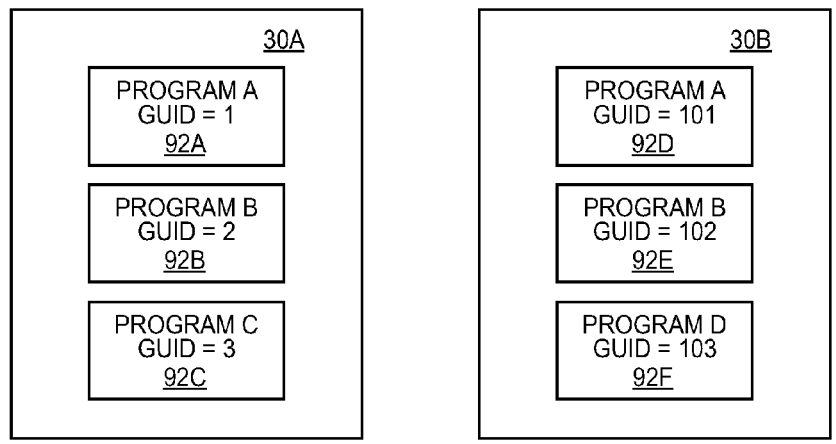
FIG. 11 illustrates an exemplary merged guide at a first point in time.
Figure 12:
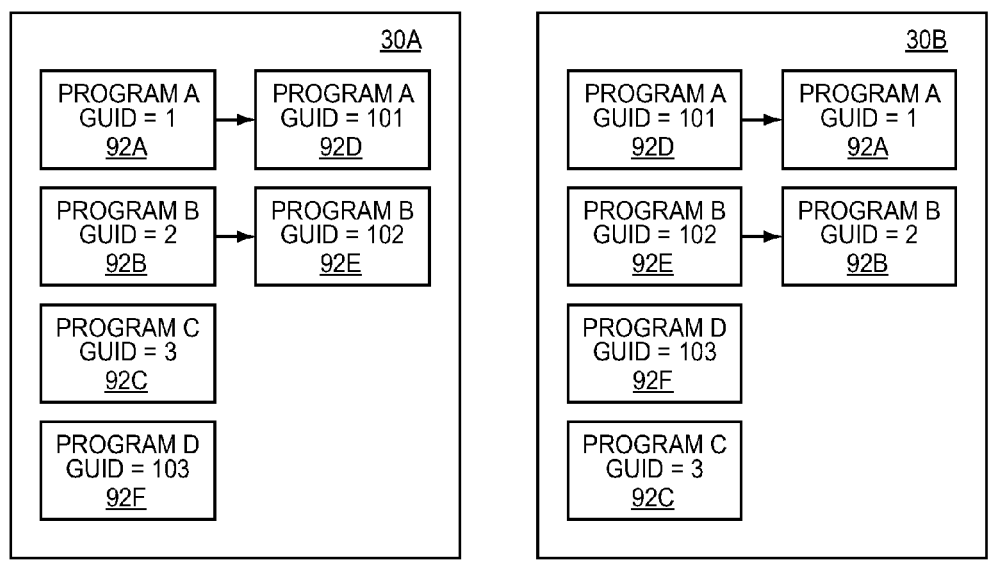
FIG. 12 illustrates the exemplary merged guide illustrated in FIG. 11 at a second point in time.

FIGS. 11 and 12 are block diagrams illustrating exemplary relationships between several program records 92. FIG. 11 illustrates that at a first point in time, the merged guide 30A contains a plurality of program records 92A-92C, each of which may be considered a parent program record 92. Similarly, the merged guide 30B contains a plurality of program records 92D-92F, each of which may also be considered a parent program record 92. FIG. 12 illustrates an exemplary relationship between program records 92 after the media controller 12A has communicated the program records 92A-92C to the media controller 12B, and has received from the media controller 12B the program records 92D-92F. As illustrated, the media controller 12A determined that the program record 92D identified the same program as identified by the program record 92A, and consequently made the program record 92D a child record to the program record 92A. The program record 92E was also determined to identify the same program as identified by the program record 92B, and was therefore similarly made a child record to the program record 92B. Because the program record 92F did not match any other program record 92 in the merged guide 30A, the program record 92F is made a parent program record 92F.

A similar analysis was conducted by the media controller 30B, and thus the program record 92A was made a child record of the program record 92D, and the program record 92B was made a child record of the program record 92E.

Figure 13:
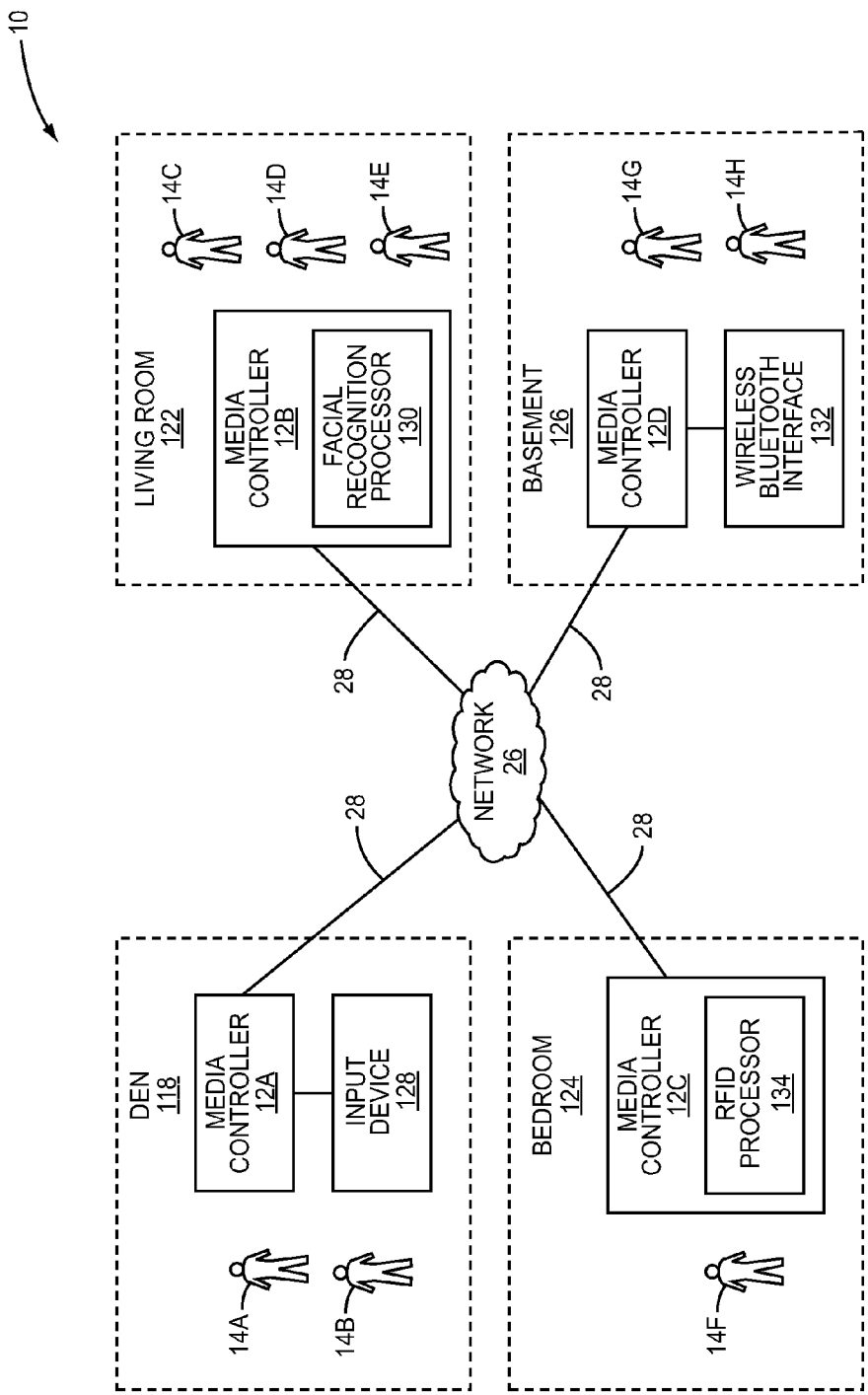
FIG. 13 is a block diagram illustrating exemplary mechanisms that may be used by a media controller to determine the identity of a particular viewer.

According to one embodiment, the media controller 12 may determine the identity of the viewers 14 that are in proximity to the media controller 12. This information may be stored in the viewers list 110 of the program records 92 for the corresponding programs that are presented by the media controller 12. FIG. 13 is a block diagram illustrating exemplary mechanisms that may be used by a media controller 12 to determine the identity of a particular viewer. The media controller 12A in a den 118 is communicatively coupled to an input device 128. As the viewers 14A, 14B enter the den 118, each viewer 14A, 14B uses the input device 128 to indicate that the respective viewer 14A, 14B is in the den 118 and watching programming presented by the media controller 12A. Prior to exiting the den 118, each viewer 14A, 14B may use the input device 128 to indicate they are departing the den 118. The media controller 12A may maintain the identity of the viewers 14 who are in the den 118, and for each program provided during the presence of a viewer 14, update the viewers list 110 in the program record 92 corresponding to the presented program. The input device 128 may comprise any suitable device and interface, such as a keyboard, or a mouse and a computer having a user interface that enables a viewer 14 to simply click on a designated portion of a display to indicate the presence or departure of the viewer 14 from the den 118. The computer may be wirelessly coupled to the media controller 12A, and communicate the status of incoming and outgoing viewers 14 to the media controller 12 as appropriate.

The media controller 12B in the living room 122 includes a facial recognition processor 130 that is able to identify through facial processing technology the viewers 14C-14E. Facial recognition technology is known to those skilled in the art, and will not be described in detail herein. The facial recognition processor 130 communicates the identity of the viewers 14C-14E to the media controller 12B. While the facial recognition processor 130 is illustrated as being integral with the media controller 12B, in an alternate embodiment, the facial recognition processor 130 may be separate from but coupled to media controller 12B via a wired or wireless communications channel, for example.

The media controller 12C in a bedroom 124 includes a radio frequency identification (RFID) processor 134. The RFID processor 134 may receive a signal from a device worn, or carried, by the viewer 14F. For example, a cell phone of the viewer 14F may emit a signal that can be received by the RFID processor 134. Upon receipt of such signal, the RFID processor 134 can communicate the identity of the viewer 14F to the media controller 12C.

The media controller 12D in a basement 126 is coupled to a wireless Bluetooth interface which enables the media controller 12D to communicate with Bluetooth devices, such as a cell phone, that contain the appropriate software to interface with the media controller 12D. Such software may be programmed to emit a signal that can be detected by the media controller 12D via the wireless Bluetooth interface 132. The signal may contain an identifier identifying a particular viewer 14G, 14H. The media controller 12D may periodically poll the cell phone to determine if the viewer 14G, 14H is still in proximity of the media controller 12D. If the media controller 12D does not receive a response to the poll, the media controller 12D may determine that the viewers 14G, 14H are no longer in proximity of the media controller 12D.

Figure 14:
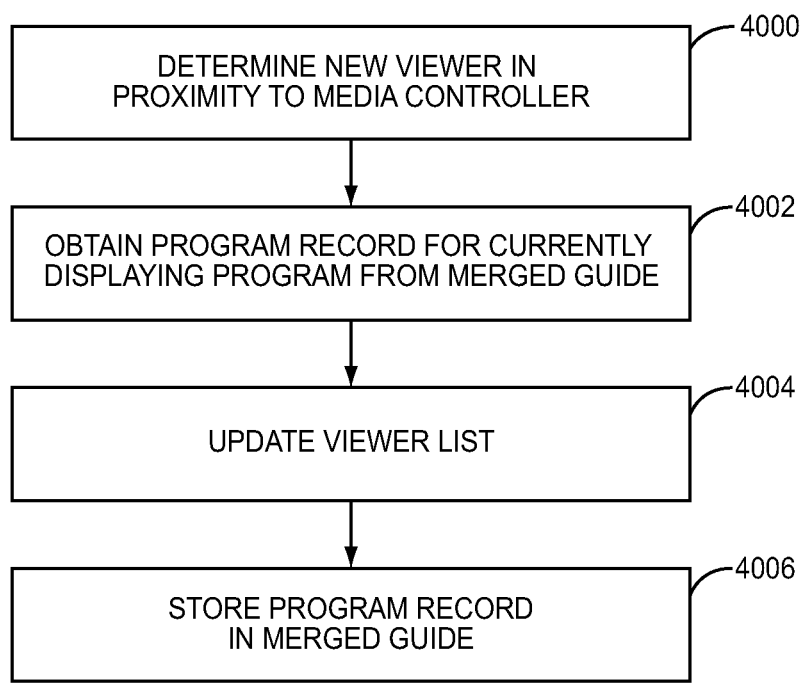
FIG. 14 is a flowchart illustrating an exemplary method for integrating viewer information with a program record.

FIG. 14 is a flowchart illustrating an exemplary method for storing viewer information into a program record 92. The media controller 12 determines that a new viewer 14 is in proximity to the media controller 12, and identifies the new viewer 14 (step 4000). The media controller 12 may use one of the mechanisms described with regard to FIG. 13, or any other suitable mechanism. The media controller 12 obtains the program record 92 corresponding to the program that is currently being provided for display by the media controller 12 (step 4002). The media controller 12 updates the viewer list 110 of the program record 92 to include an identification of the new viewer 14 (4004). Preferably, the media controller 12 also updates the record update timestamp of the program record 92. The media controller 12 stores the program record 92 in the merged guide (step 4006). Note that the media controller 12 may also broadcast a notification signal to the network 26 to notify other media controllers 12 that the media controller 12 has new program metadata to distribute. In this manner, each media controller 12 coupled to the network 26 may be, substantially in real-time, provided data that identify who, in which room, is watching which programs.

According to one embodiment, the merged guide 30 may be used by the media controller 12 to cause a display of guide information that may be desired by a viewer 14. FIG. 15 illustrates an exemplary guide window 136 suitable for displaying guide information obtained from the merged guide 30. Assume that the media controller 12 causing the display of the guide window 136 is located in the living room. The guide window 136 includes a channel column 138 identifying a plurality of channels. The channel information depicted in the channel column 138 is obtained from the channel field 86 (FIG. 6). The guide window 136 may also include program information area 140 identifying a plurality of programs that have, are, or may be available for presentation by the media controller 12. The program information area 140 is obtained from the program records 92. Program information area 140A illustrates the presentation of information obtained by a parent program record 92 and a child program record 92 identifying the same program, in this example, the show "Survivor." Program information area 140A identifies for the viewer 14 that Survivor is available in the living room, and is also available in the den. Program information area 140A also indicates that the version of Survivor available in the living room is a standard definition version, while the version available in the den is a high definition version. Program information area 140B similarly informs the viewer 14 that the show "Castle" is available in standard definition in the bedroom and the living room, and in high definition in the den.

FIG. 16 illustrates another exemplary guide window 136 suitable for displaying historical information obtained from the merged guide 30. Assume that the present time of the display is 7:10. Program information area 140A indicates that the viewers 14, Matt and Ben, viewed the news on the ABC channel between 6:00-7:00. The program information area 140B indicates that viewers Jack and Jill viewed the CW news between 6:00 and 7:00. The program information area 140A is obtained from the viewers list 110 of the program record 92 corresponding to the news program carried on ABC between 6:00-7:00. Similarly, the program information area 140B is obtained from the viewers list 110 of the program record 92 corresponding to the news program carried on CW between 6:00-7:00. In this manner, a viewer 14 may determine who watched which programs.

Figure 17:
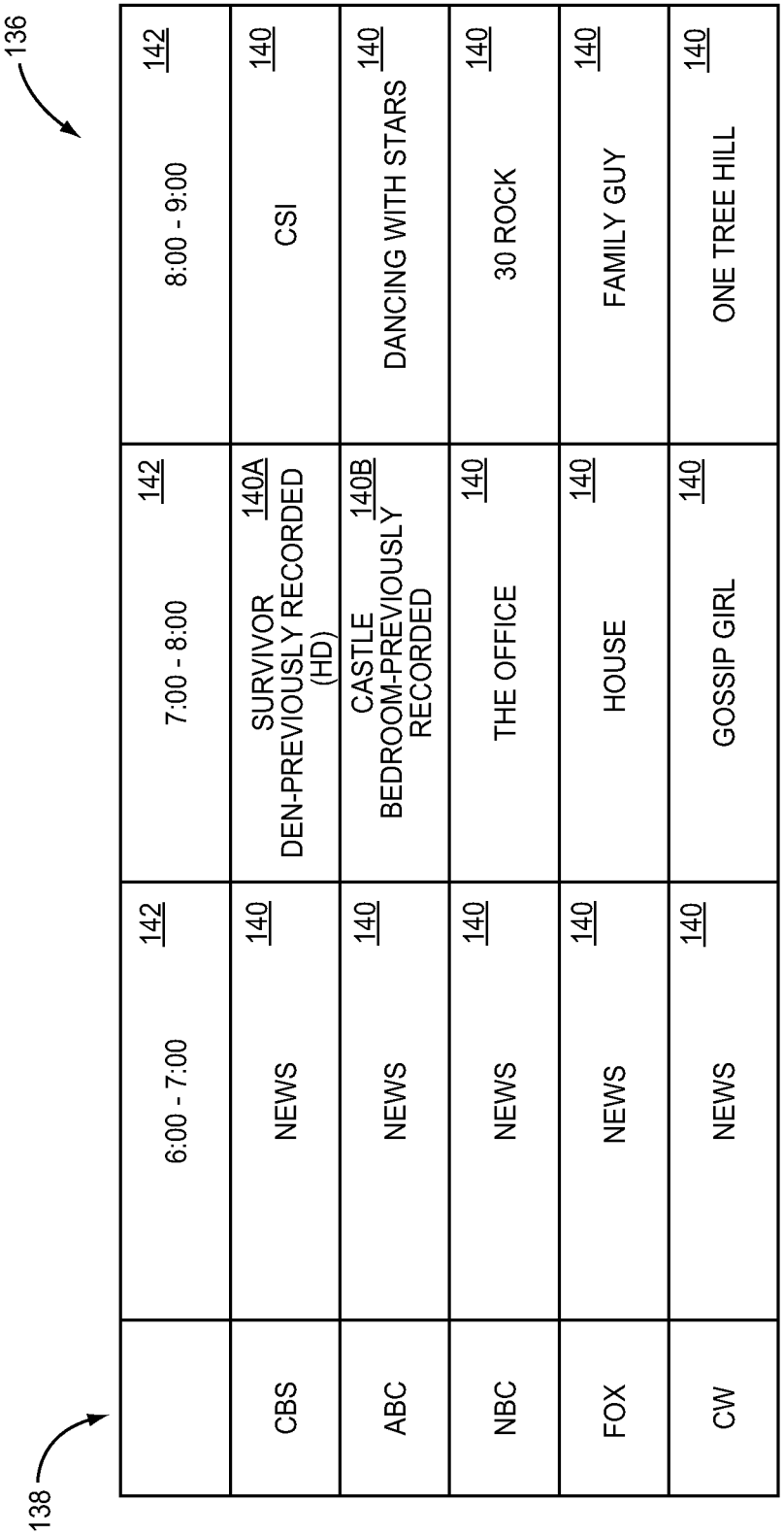
FIG. 17 illustrates another exemplary guide window suitable for displaying information obtained from the merged guide.

FIG. 17 illustrates another exemplary guide window 136 suitable for displaying information obtained from the merged guide 30. The program information area 140A indicates that the show Survivor is available in the living room, and has also been previously recorded by the media controller 12 in the den. The program information area 140B indicates that the show Castle is available in the living room, and has also been previously recorded by the media controller 12 in the bedroom.

Figure 18:
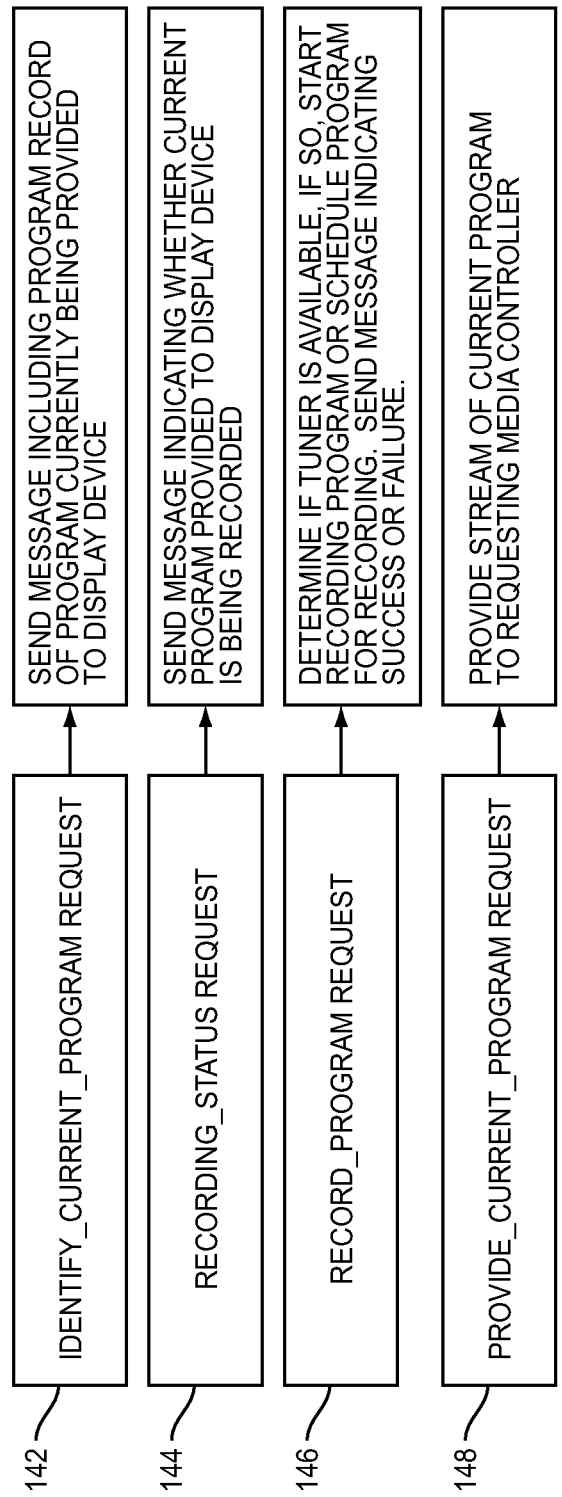
FIG. 18 is block diagram illustrating exemplary requests that one media controller may make of another media controller.

According to another embodiment, the one media controller 12 may send requests to another media controller 12 for information, or to direct the other media controller 12 to provide a desired function. FIG. 18 is block diagram illustrating certain requests that one media controller 12 may make of another media controller 12 according to one embodiment. For example, the media controller 12A may send an IDENTIFY_CURRENT_PROGRAM request 142 to the media controller 12B. An IDENTIFY_CURRENT_PROGRAM request 142 requests that the media controller 12B identify the specific program that is currently being provided by the media controller 12B. In response, the media controller 12B may provide the media controller 12A the program record 92 corresponding to the program that the media controller 12B is currently presenting.

The media controller 12A may send the media controller 12B a RECORDING_STATUS_REQUEST 144, which requests information regarding the recording status of the program that is currently being presented by the media controller 12B. In response, the media controller 12B provides a message indicating whether the current program being provided by the media controller 12B is being recorded. The media controller 12A may send the media controller 12B a RECORD_PROGRAM request 146, which requests that the media controller 12B record a particular program. The RECORD_PROGRAM request 146 may include the program record 92 corresponding to the program that is to be recorded. In response, the media controller 12B may determine that no tuner is available to record the program, or may begin recording the desired program, or may schedule the desired program for recording if the program has not begun yet. The media controller 12B may provide the media controller 12A a message indicating success or failure of the request. The media controller 12A may send the media controller 12B a PROVIDE_CURRENT_PROGRAM request 148, which requests that the media controller 12B provide a program stream of the program that is currently being provided by the media controller 12B. The media controller 12B, using the retransmitter 40, may then provide a program stream of the program which is currently being provided by the media controller 12B.

Figure 19:
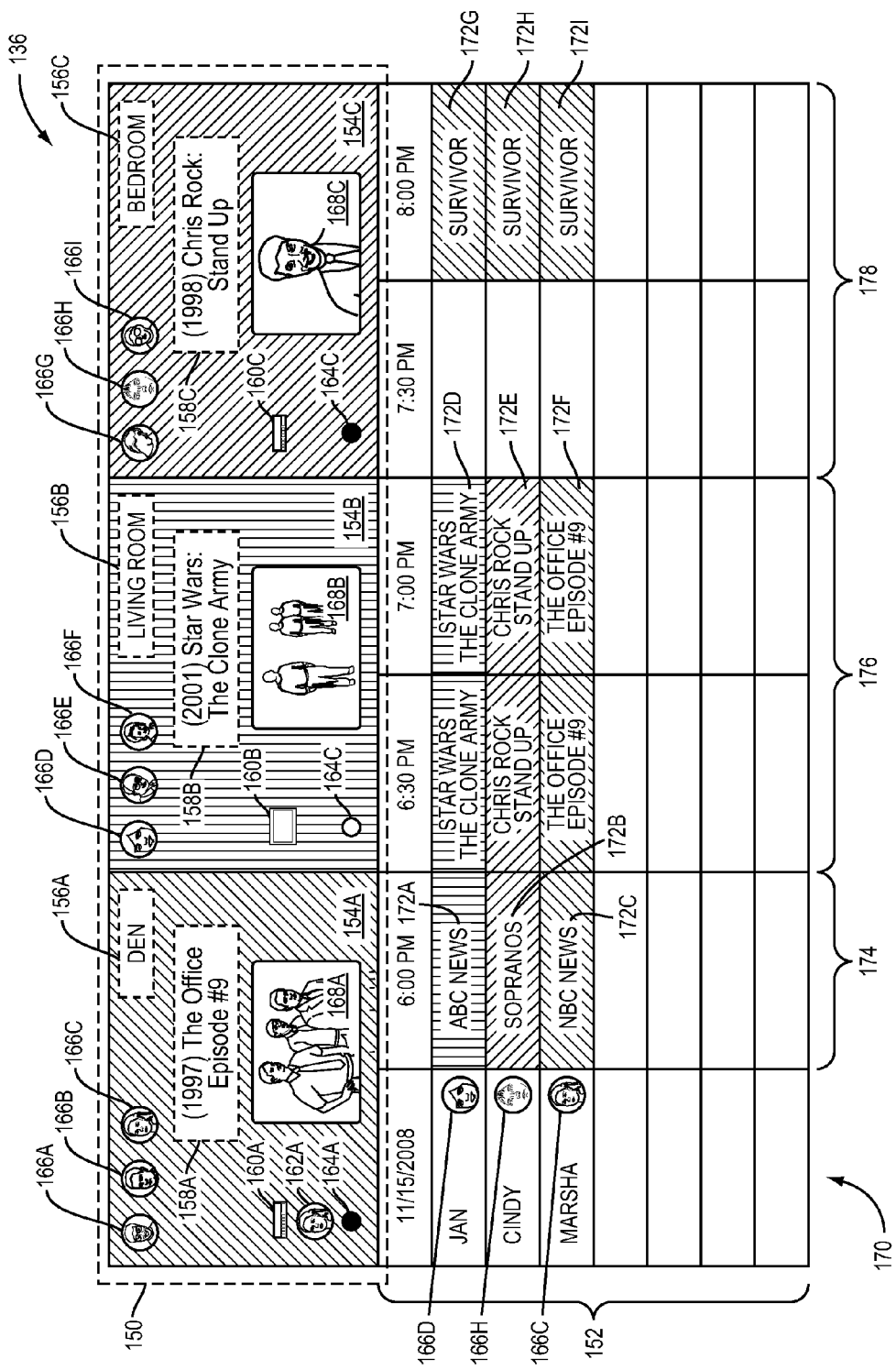
FIGS. 19-21 illustrate exemplary guide windows suitable for displaying information obtained from the merged guide.

FIG. 19 illustrates another exemplary guide window 136 suitable for displaying information obtained from the merged guide 30. Assume that the media controller 12 causing the display of the guide window 136 is located in the living room. The guide window 136 generally contains two portions, a media controller information area 150 and a program-by-viewer area 152. The media controller information area 150 provides current status information about selected media controllers 12 coupled to the network 26. The selected media controllers 12 may be each media controller 12 coupled to the network 26, or a subset thereof. For example, if a media controller 12 is not currently providing any programs to a viewer 14, that media controller 12 may not be selected, and therefore will not have a corresponding media controller information area 150 in the guide window 136.

Assume for purposes of illustration that the media controller 12A is located in the den, the media controller 12B in the living room and the media controller 12C in the bedroom. The guide window 136 includes media controller information areas 154A-154C, each of which corresponds to a respective media controller 12A-12C. Thus, the media controller information area 154A corresponds to the media controller 12A. The media controller information area 154A includes a media controller location identifier 156A, which for the media controller 12A indicates the media controller 12A is in the den. The media controller information area 154A also includes a program identification 158A which identifies the program currently being provided by the media controller 12A. In this example, the program being provided by the media controller 12A is titled "(1997) The Office: Episode #9." The media controller information area 154A may include a device type identifier 160A which identifies the type of device of the media controller 12A. The device type identifier 160A may be a textual description, such as "set top box", or "computer", or "XBOX", or may comprise an image or icon which graphically depicts the device type. The device type identifier 160A may be derived in whole or in part from the name field 58. For example, if the media controller 12A is a set top box, the device type identifier 160A may comprise a set top box image or icon. Alternately, if the media controller 12A is a computer, the device type identifier 160A may comprise a computer image or icon.

The media controller information area 154A may also include requestor identifier 162A which identifies the viewer 14 that is requesting the display of the guide window 136. The requestor identifier 162 may be a textual identifier, such as the name of the viewer 14, or may by an icon or image that the viewer 14 designated as corresponding to the viewer 14. The media controller information area 154A may provide a recording status indicator 164a, indicating whether or not the program currently being provided by the media controller 12A is being recorded. The media controller information area 154A preferably includes viewer identifiers 166A-166C corresponding to the viewers 14 that have been determined to be in proximity to the media controller 12A. The viewer identifiers 166A-166C may comprise textual identifiers, such as the names of the corresponding viewers 14, or may comprise unique icons or images that each of the viewers 14 has previously identified to the media controller 12A as representing such viewer 14, or may be a combination of both a name and an icon or image. The media controller information area 154A may also include program display area 168A wherein a real-time display of the program currently being provided by the media controller 12A is displayed.

The media controller information area 154B contains similar information corresponding to the media controller 12B. A media controller location identifier 156B identifies the location of the media controller 12B as the living room. A program identification 158B identifies the program currently being provided by the media controller 12B as "(2001) Star Wars: The Clone Army." A device type identifier 160B indicates a type of device of the media controller 12B. A recording status indicator 164B indicates that the media controller 12B is not recording the program that is currently being provided. Viewer identifiers 166D-166F identify three viewers 14 as watching the program currently being provided by the media controller 12B. A program display area 168B provides a display of the program currently being provided by the media controller 12B. The information used to provide the program display area 168B may be generated by the media controller 12B and provided to the media controller 12A in response to a request from the media controller 12A, as described previously. For example, upon receiving a request from a viewer 14 to display the guide window 136, the media controller 12A may send each selected media controller 12 a provide current program request 150 (FIG. 18). As the media controller 12A receives the program streams, the media controller 12A renders each program stream in the appropriate program display area 168.

The media controller information area 154C contains similar information for the media controller 12C. A media controller location identifier 156C identifies the location of the media controller 12C as the bedroom. A program identification 158C identifies the program currently being provided by the media controller 12C as "(1998) Chris Rock: Stand Up." A device type identifier 160C indicates a type of device of the media controller 12C. A recording status indicator 164C indicates that the media controller 12C is recording the program that is currently being provided. Viewer identifiers 166G-166I identify three viewers 14 as watching the program currently being provided by the media controller 12C. A program display area 168C provides a display of the program currently being provided by the media controller 12C.

Note that each media controller information area 154 is depicted in FIG. 19 as having unique cross-hatching. Alternatively, each media controller information area 154 may preferably depict a unique status background imagery, shading, coloring, or the like, to visually distinguish each such media controller information area 154 from one another. As will be discussed in greater detail here with regard to the program-by-viewer area 152, such distinguishing background visually associates viewing activity with a particular location.

The program-by-viewer area 152 includes a viewer column 170 which identifies one or more viewers 14. For purposes of illustration, information for only three viewers 14 are illustrated, but it is apparent that the program-by-viewer area 152 may provide information for any number of viewers 14. Each viewer 14 may have a viewer identifier 166, as discussed previously, which may comprise a textual identifier such as a name, an image, or both. The program-by-viewer area 152 preferably contains a row of information for each viewer 14. The program-by-viewer area 152 may provide historical information 174, current information 176 and future recommendations 178. Assume for the purposes of illustration that the guide window is displayed at 7:00 PM. A program information area 172A illustrates that Jan viewed the ABC News program between 6:00 and 6:30. As depicted by cross-hatch, the program information area 172A preferably has a background imagery, shading, coloring, or the like that matches one of the media controller information areas 154. For example, the information area 172A indicates by cross-hatching that Jan viewed the ABC News program in the living room, because the cross-hatching of the information area 172A matches the cross-hatching of the media controller information area 154B. Similarly, information area 172B indicates that Cindy viewed the Sopranos program in the bedroom. Information area 172C indicates that Marsha viewed the NBC News program in the den. While information areas 172 identify a particular program, it should be apparent that additional, or different information could be provided. For example, information areas 172 may provide the channel information associated with the program in addition to, or in place of, the program identification information.

The program information area 172D in the current information 176 indicates that Jan is currently watching Star Wars: The Clone Army in the living room. The program information area 172E indicates that Cindy is currently watching Chris Rock: Stand Up in the bedroom. The program information area 172F indicates that Marsha is currently watching The Office: Episode #9 in the den.

The future recommendations 178 may provide program recommendations based on previous viewing habits, or based on preferences that have been provided by the respective viewer 14. Previous viewing information may be maintained in the merged guide 30 for a period of time, and after a predetermined period archived from the merged guide 30 and stored in a separate data structure. Information such as preferred shows, channels, genres, actors, times, days and the like may be gleaned for each viewer 14, and based on this information, the guide window 136 may provide recommendations on a viewer-by-viewer basis. For example, based on past viewing history, user preferences, or a combination of both, the information areas 172G-172I indicate that a recommendation for each of Jan, Cindy and Marsha is the program Survivor. The information areas 172G-172I further recommend that the program Survivor be viewed in the den. This may be based on historical information that Survivor is provided by the media controller 12A in the Den with a sufficient frequency to predict that Survivor will likely be provided in the future in the den. For example, it may be determined that Survivor was provided in the den at 8:00 PM for seven of the previous eight weeks. While for purposes of illustration the program information areas 172G-172I have recommended the same program for each of Jan, Cindy and Marsha, it is apparent that different programs, and different locations, may be provided for each such viewer 14.

Figure 20:
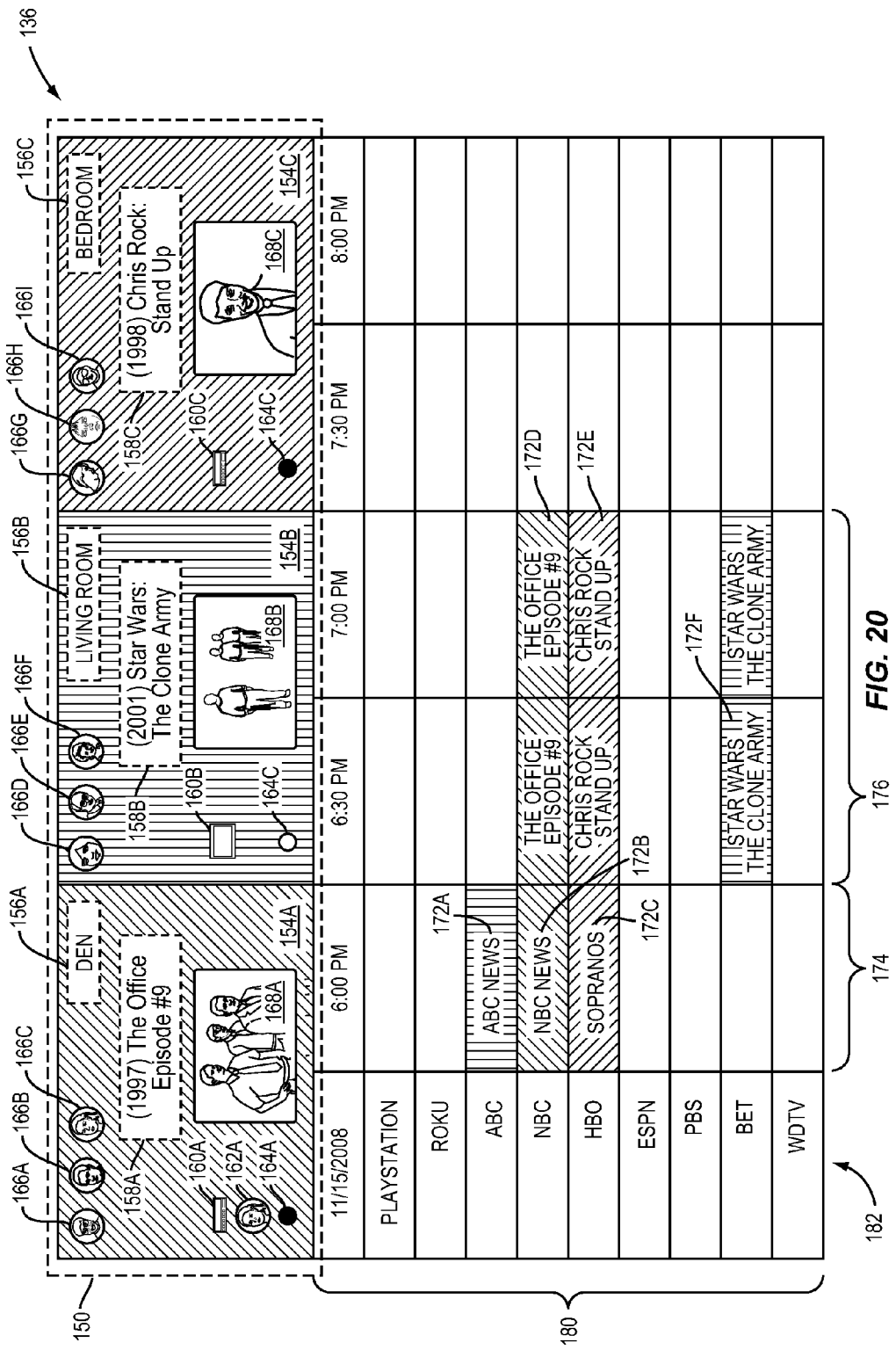

FIG. 20 illustrates another exemplary guide window 136 suitable for displaying information obtained from the merged guide 30. Assume as before that the media controller 12 causing the display of the guide window 136 is located in the living room, and that the current time is 7:00, however, the information in the guide window 136 may not otherwise be consistent with the information provided in FIG. 19. The guide window 136 generally contains two portions, a media controller information area 150 and a view-by-channel area 180. The media controller information area 150 was described previously with regard to FIG. 19. The view-by-channel area 180 includes a channel column 182 in which one or more channels are identified. Note that devices that provide programs from local storage may be identified as a channel, such as the Playstation or Roku media controllers 12. While for purposes of illustration only several channels are depicted in the guide window 136, it will be apparent that any number of channels could be provided.

The view-by-channel area 180 can include a historical information 174 and a current information 176. The historical information 174 may include program information areas 172 that identify which programs were previously provided by a media controller 12. For example, program information area 172A indicates that ABC News was provided at 6:00, and by virtue of the cross-hatching, that ABC News was provided in the living room. The program information area 172B indicates that NBC News was provided at 6:00, and by virtue of the cross-hatching, that NBC News was provided in the den. The program information area 172C indicates that the program Sopranos was provided at 6:00, and by virtue of the cross-hatching, that the Sopranos was provided in the bedroom.

The program information area 172D indicates that the program The Office: Episode #9 on NBC is currently being provided in the den. The program information area 172E indicates that the program Chris Rock: Stand Up on HBO is currently being provided in the bedroom. The program information area 172F indicates that the program Star Wars: The Clone Army on BET is currently being provided in the living room.

Figure 21:
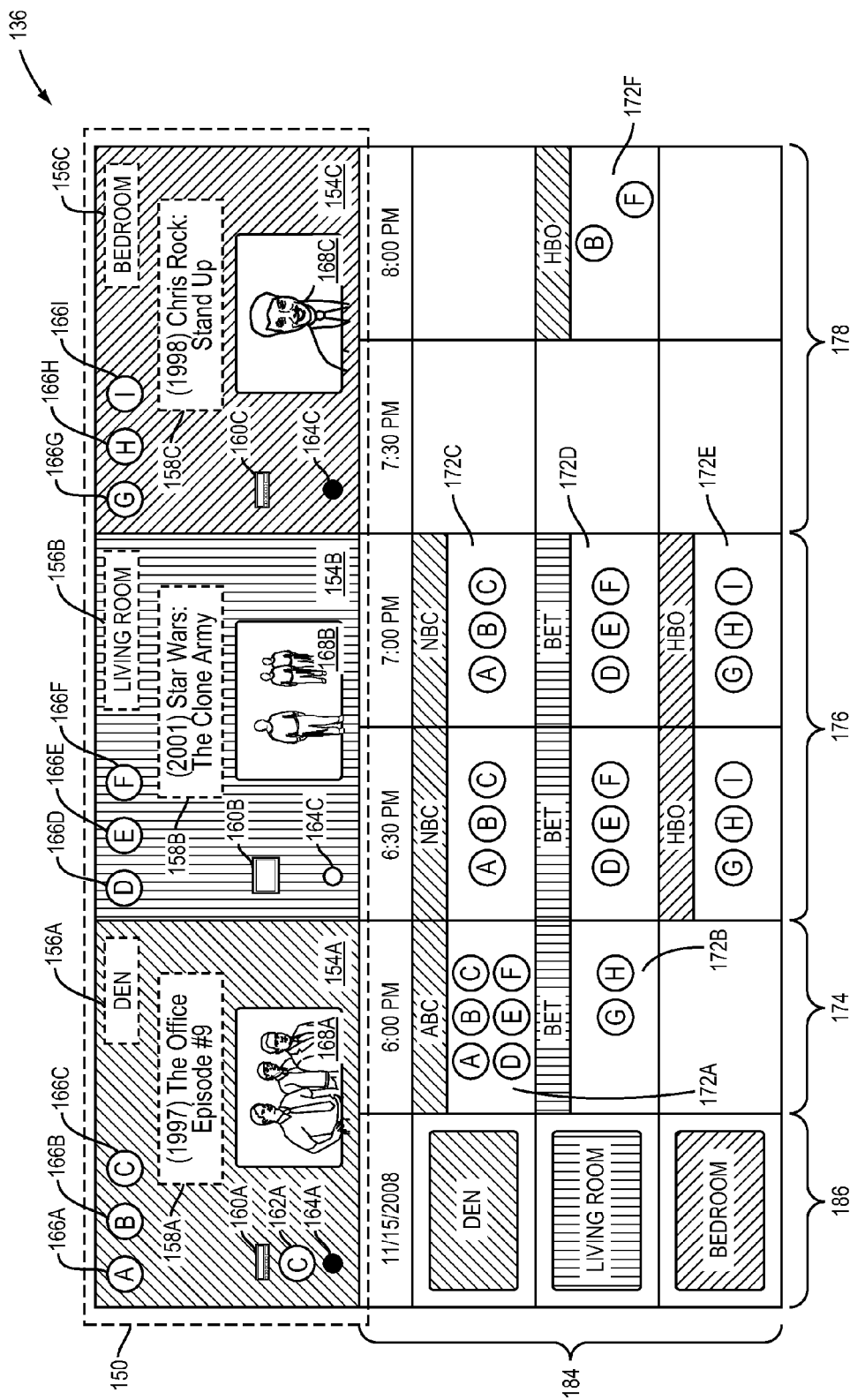

FIG. 21 illustrates another exemplary guide window 136 suitable for displaying information obtained from the merged guide 30. Assume as before that the media controller 12 causing the display of the guide window 136 is located in the living room, and that the current time is 7:00, however, for purposes of illustration the information in the guide window 136 is not consistent with the information provided in FIGS. 19 and 20. The guide window 136 generally contains two portions, a media controller information area 150 and a view-by-room area 184. The media controller information area 150 was described previously with regard to FIG. 19, and will not be discussed in detail again. However, for purposes of illustration, a letter is used to identify each of a plurality of viewers 14, and is depicted in the corresponding viewer identifiers 166 illustrated herein. While such viewer identifiers 166 preferably contain names of the viewers 14, images or icons associated with the viewers 14, or a combination thereof, for purposes of ease of illustration viewers 14 will be identified by a single letter with regard to FIG. 21.

The view-by-room area 184 includes a location column 186 identifying a location of each media controller 12 for which information will be displayed. The view-by-room area 184 may provide historical information 174, current information 176 and future recommendations 178. The historical information 174 may include program information areas 172 identifying what channels, programs, or combination of channels and programs were provided in which locations.

The program information areas 172 may also depict which viewers viewed which programs at which locations. For example, the program information area 172A indicates that viewers A, B, C, D, E, and F watched the ABC channel in the den between 6:00 and 7:00. The program information area 172B indicates that viewers G and H watched the BET channel in the living room between 6:00 and 7:00.

The current information 176 may include program information areas 172 identifying what channels, programs, or a combination of channels and programs are currently being provided in which locations. For example, the program information area 172C indicates that viewers A, B and C are currently watching the NBC channel in the den. The program information area 172D indicates that viewers D, E and F are currently watching the BET channel in the living room. The program information area 172E indicates that viewers G, H, and I are currently watching the HBO channel in the bedroom.

As discussed with regard to FIG. 19, the future recommendations 178 may provide program or channel recommendations based on previous viewing habits, preferences that have been provided by the respective viewer 14, or a combination of both. For example, the program information area 172F indicates a recommendation for viewers B and F to watch the HBO channel in the den at 8:00 PM.

Figure 22:
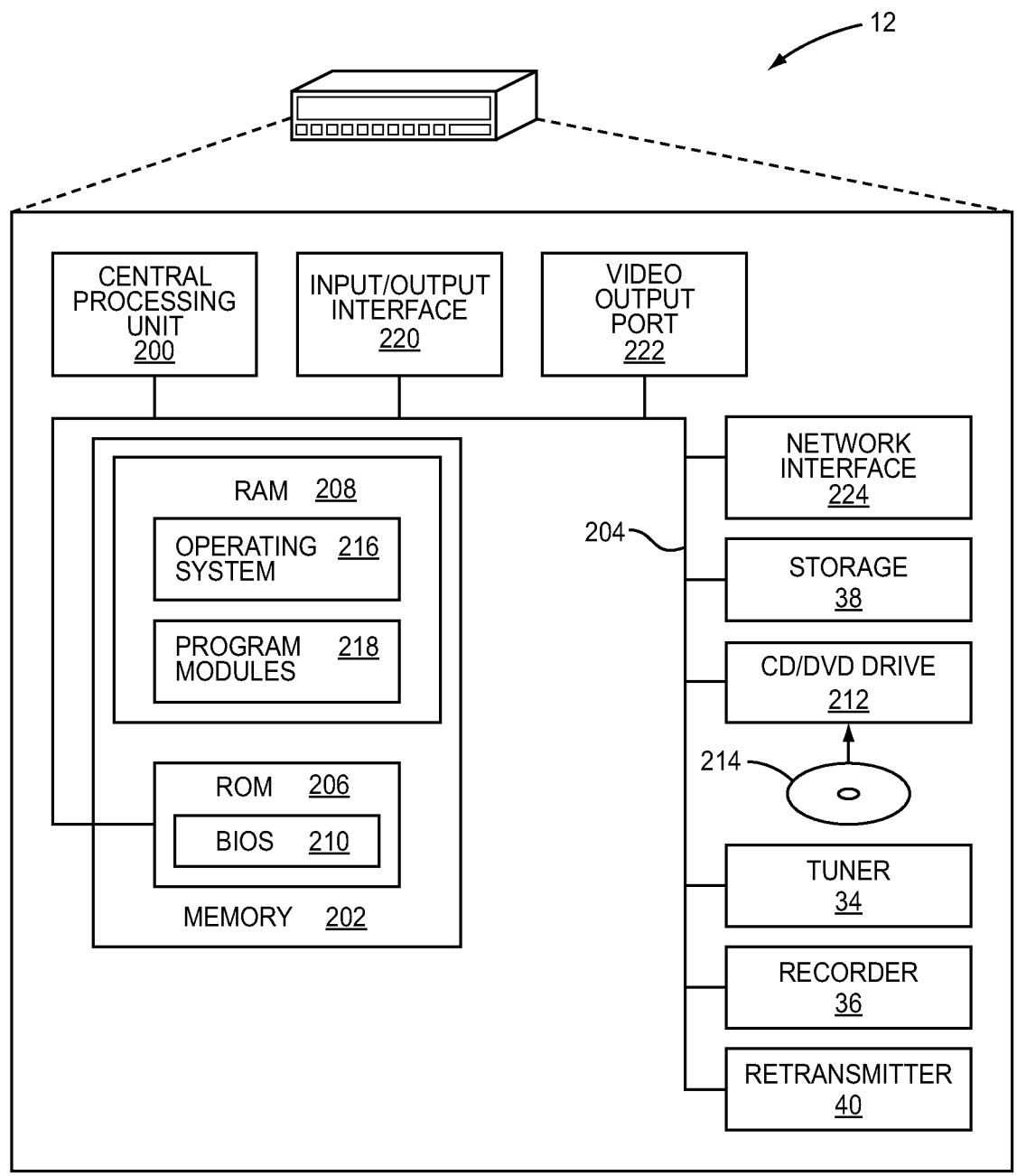
FIG. 22 illustrates an exemplary media controller according to one embodiment.

FIG. 22 illustrates an exemplary media controller 12 according to one embodiment. The media controller 12 may, as discussed previously, comprise a set top box, a digital video recorder, an intelligent gaming console, such as the Microsoft® Xbox®, Sony® PlayStation®, and Nintendo® GameCube®, a media console such as the Apple® TV®, personal computers, and the like. In addition to components discussed previously herein, the exemplary media controller 12 may also include a central processing unit 200, a system memory 202, and a system bus 204. The system bus 204 provides an interface for system components including, but not limited to, the system memory 202 and the central processing unit 200. The central processing unit 200 can be any of various commercially available or proprietary processors. Dual microprocessors and other multi-processor architectures may also be employed as the central processing unit 200.

The media controller 12 may include one or more tuners 34 for selecting program content from a communications channel. The recorder 36 may receive a source input from the tuner 34 and store the content onto a storage device, such as the storage 38. The retransmitter 40 may provide a program of stream of program content over the network 26 to another media controller 12.

The system bus 204 can be any of several types of bus structures that may further interconnect to a memory bus (with or without a memory controller), a peripheral bus, and a local bus using any of a variety of commercially available bus architectures. The system memory 202 can include non-volatile memory 206 (e.g., read only memory (ROM), erasable programmable read only memory (EPROM), electrically erasable programmable read only memory (EEPROM), etc.) and/or volatile memory 208 (e.g., random access memory (RAM)). A basic input/output system (BIOS) 210 can be stored in the non-volatile memory 206, which can include the basic routines that help to transfer information between elements within the media controller 12. The volatile memory 208 can also include a high-speed RAM such as static RAM for caching data.

The media controller 12 may further include a storage 38, which may comprise, for example, an internal hard disk drive (HDD) (e.g., enhanced integrated drive electronics (EIDE) or serial advanced technology attachment (SATA)) for storage. The media controller 12 may further include an optical disk drive 212 (e.g., for reading a compact disk or DVD 214). The drives and associated computer readable media provide nonvolatile storage of data, data structures, computer-executable instructions, and so forth. For the media controller 12, the drives and media accommodate the storage of any data in a suitable digital format. Although the description of computer-readable media above refers to an HDD and optical media such as a CD-ROM or DVD, it should be appreciated by those skilled in the art that other types of media which are readable by a computer, such as Zip disks, magnetic cassettes, flash memory cards, cartridges, and the like, may also be used in the exemplary operating environment, and further, any such media may contain computer-executable instructions for performing novel methods of the disclosed architecture.

A number of program modules can be stored in the drives and volatile memory 208 including an operating system 216 and one or more program modules 218 which implement the functionality described herein. It is to be appreciated that the embodiments can be implemented with various commercially available operating systems or combinations of operating systems. All or a portion of the embodiments may be implemented as a computer program product, such as a computer usable medium having a computer-readable program code embodied therein. The computer-readable program code can include software instructions for implementing the functionality of embodiments described herein. The central processing unit 200 in conjunction with the program modules 218 in the volatile memory 208 may serve as a control system for the media controller 12 that is adapted to implement the functionality described herein.

A user can enter commands and information into the media controller 12 through one or more wired/wireless input devices, for example, a keyboard and a pointing device, such as a mouse (not illustrated). Other input devices (not illustrated) may include a microphone, an infrared (IR) remote control, a joystick, a game pad, a stylus pen, a touch screen, or the like. These and other input devices are often connected to the central processing unit 200 through an input device interface 220 that is coupled to the system bus 204 but can be connected by other interfaces such as a parallel port, an IEEE 1394 serial port, a game port, a universal serial bus (USB) port, an IR interface, etc.

The media controller 12 may drive a separate or integral display device 16, which may also be connected to the system bus 204 via an interface, such as a video output port 222. The media controller 12 may operate in a networked environment using a wired and/or wireless communication network interface 224. The network interface 224 can facilitate wired and/or wireless communications to the network 26 (FIG. 1).

The media controller 12 may be operable to communicate with any wireless devices or entities operatively disposed in wireless communication, for example, a printer, a scanner, a desktop and/or portable computer via wireless technologies, such as Wi-Fi and Bluetooth, for example.

Embodiments have been provided herein for purposes of illustration and explanation, but those skilled in the art will recognize that many additional and/or alternative embodiments are possible. For example, while a plurality of guide windows 136 in various formats, and depicting various information have been provided, it is apparent that embodiments may provide the same information in many different formats, and provide additional information based on the program records 92.

Those skilled in the art will recognize improvements and modifications to the embodiments. All such improvements and modifications are considered within the scope of the concepts disclosed herein and the claims that follow.

What is claimed is:

1. A method for generating a program guide, comprising:
receiving, by a first media controller coupled to a local area network (LAN), from a content provider, program metadata identifying a first plurality of programs, wherein the first plurality of programs corresponds to a first content package provided by the content provider;
generating, by the first media controller, a first program record identifying a first program of the first plurality of programs, the first program record comprising first program metadata associated with the first program;
transmitting the first program metadata onto the LAN to make the first program metadata available to a second media controller that is coupled to the LAN;
receiving, by the first media controller, second program metadata from the second media controller, the second program metadata associated with a second program of a second plurality of programs which correspond to a second content package associated with the second media controller; and
storing the first program metadata and the second program metadata in a program guide on the first media controller, wherein the first media controller enables display of the program guide.

2. The method of claim 1, further comprising:
generating a globally unique identifier (GUID), and storing the GUID in the first program record prior to transmitting the first program metadata onto the LAN.

3. The method of claim 1, wherein the first media controller receives the first content package via a subscription associated with the first media controller, and wherein the first content package is different from the second content package.

4. The method of claim 3, wherein the second media controller receives the second content package via a subscription associated with the second media controller.

5. The method of claim 1, further comprising:
comparing the second program metadata to the first program metadata;
determining that the second program metadata identifies a same program as the first program; and
storing the second program metadata in a second program record in association with the first program record wherein the second program is identified as the same program as the first program.

6. The method of claim 5, further comprising:
receiving a request to present guide information;
obtaining the first program record and the second program record; and
causing a display on a display device that concurrently identifies the first program as being associated with the first media controller and the second program as being associated with the second media controller.

7. The method of claim 1, further comprising receiving, by the first media controller, third program metadata associated with a third program stored on the second media controller, and storing the third program metadata in a third program record in the program guide.

8. The method of claim 7, further comprising:
comparing the third program metadata to the first program metadata;
determining that the first program comprises a same program as the third program; and
storing the third program record in association with the first program record wherein the third program record is identified as comprising the same program as the first program.

9. The method of claim 8, further comprising:
receiving a request to present the program guide;
obtaining the first program record and the third program record; and
causing a display on a display device that concurrently identifies the first program as being associated with the first media controller and the third program as being stored on the second media controller.

10. The method of claim 1, further comprising:
causing a display of the first program on a display device;
determining that a first viewer is in proximity to the first media controller;
storing in the first program record a first identifier identifying the first viewer to generate an updated first program record; and
transmitting the updated first program record onto the LAN to make the updated first program record available to the second media controller.

11. The method of claim 10, further comprising determining that a second viewer is in proximity to the first media controller; and
storing in the first program record the first identifier identifying the first viewer and a second identifier identifying the second viewer to generate the updated first program record.

12. The method of claim 11, further comprising receiving a request to display program guide information at a point in time after the first program has been displayed on the display device; in response to the request, obtaining the updated first program record; and displaying on the display device the first identifier and the second identifier.

13. The method of claim 1, further comprising based on the program guide, causing a display on a display device that identifies the first program as being associated with the first media controller and the second program as being associated with the second media controller.

14. The method of claim 1, further comprising:
receiving a notification that the second media controller has the second program metadata available for distribution;
accessing a last update timestamp associated with the second media controller that identifies a last time at which the first media controller received program metadata from the second media controller;
sending to the second media controller a request that includes the last update timestamp; and
wherein the second program metadata is received from the second media controller in response to sending the request to the second media controller.

15. A media controller, comprising:
a network interface adapted to interface with a local area network (LAN); and
a control system coupled to the network interface, the control system including a processor and adapted to:
receive from a content provider, program metadata identifying a first plurality of programs, wherein the first plurality of programs corresponds to a first content package provided by the content provider;
generate a first program record identifying a first program of the first plurality of programs, the first program record comprising first program metadata associated with the first program;

transmit the first program record onto the LAN via the network interface to make the first program record available to a second media controller that is coupled to the LAN;

receive a second program record from the second media controller, the second program record comprising second program metadata associated with a second program of a second plurality of programs which correspond to a second content package associated with the second media controller; and store the first program record and the second program record in a program guide, wherein the media controller enables display of the program guide.

16. The media controller of claim 15, wherein the control system is further adapted to:

compare the second program metadata to the first program metadata;

determine that the second program comprises a same program as the first program; and store the second program record in association with the first program record wherein the second program record is identified as comprising the same program as the first program.

17. The media controller of claim 16, wherein the control system is further adapted to:

receive a request to display guide information;

obtain the first program record and the second program record; and cause a display on a display device that concurrently identifies the first program as being associated with the media controller and the second program as being associated with the second media controller.

18. The media controller of claim 15, wherein the control system is further adapted to:

cause a display of the first program on a display device;

determine that a first viewer is in proximity to the media controller;

store in the first program record a first identifier identifying the first viewer to generate an updated first program record; and transmit the updated first program record onto the LAN via the network interface to make the updated first program record available to the second media controller.

19. A computer program product, comprising a non-transitory computer usable medium having a computer readable program code embodied therein, the computer readable program code adapted to be executed to implement a method for generating a program guide, the method comprising:

receiving, by a first media controller coupled to a local area network (LAN), from a content provider, program metadata identifying a first plurality of programs, wherein the first plurality of programs corresponds to a first content package provided by the content provider;

generating, by the first media controller, a first program record identifying a first program of the first plurality of programs, the first program record comprising first program metadata associated with the first program;

transmitting the first program record onto the LAN to make the first program record available to a second media controller that is coupled to the LAN;

receiving, by the first media controller, a second program record from the second media controller, the second program record comprising second program metadata associated with a second program of a second plurality of programs which correspond to a second content package associated with the second media controller; and storing the first program record and the second program record in a program guide on the first media controller, wherein the first media controller enables display of the program guide.

20. The computer program product of claim 19, wherein the method further comprises:

comparing the second program metadata to the first program metadata;

determining that the second program comprises a same program as the first program; and storing the second program record in association with the first program record wherein the second program record is identified as comprising the same program as the first program.

21. The computer program product of claim 20, further comprising:

receiving a request to display guide information;

obtaining the first program record and the second program record; and causing a display on a display device that concurrently identifies the first program as being associated with the first media controller and the second program as being associated with the second media controller.

22. The computer program product of claim 19, further comprising:

causing a display of the first program on a display device;

determining that a first viewer is in proximity to the first media controller;

storing in the first program record a first identifier identifying the first viewer to generate an updated first program record; and transmitting the updated first program record onto the LAN via a network interface to make the updated first program record available to the second media controller.

23. The computer program product of claim 22, wherein the method further comprises receiving a request to display information about the first program after the first program has been displayed on the display device; in response to the request, obtaining the first program record; and displaying on the display device the first identifier.

* * * * *